J. D. WILSON.
MACHINE FOR HEMMING CAPS OR DISKS WITH SOLDER.
APPLICATION FILED SEPT. 10, 1907.

992,466.

Patented May 16, 1911.
20 SHEETS—SHEET 1.

J. D. WILSON.
MACHINE FOR HEMMING CAPS OR DISKS WITH SOLDER.
APPLICATION FILED SEPT. 10, 1907.

992,466.

Patented May 16, 1911.
20 SHEETS—SHEET 2.

J. D. WILSON.
MACHINE FOR HEMMING CAPS OR DISKS WITH SOLDER.
APPLICATION FILED SEPT. 10, 1907.
992,466.
Patented May 16, 1911.
20 SHEETS—SHEET 3.
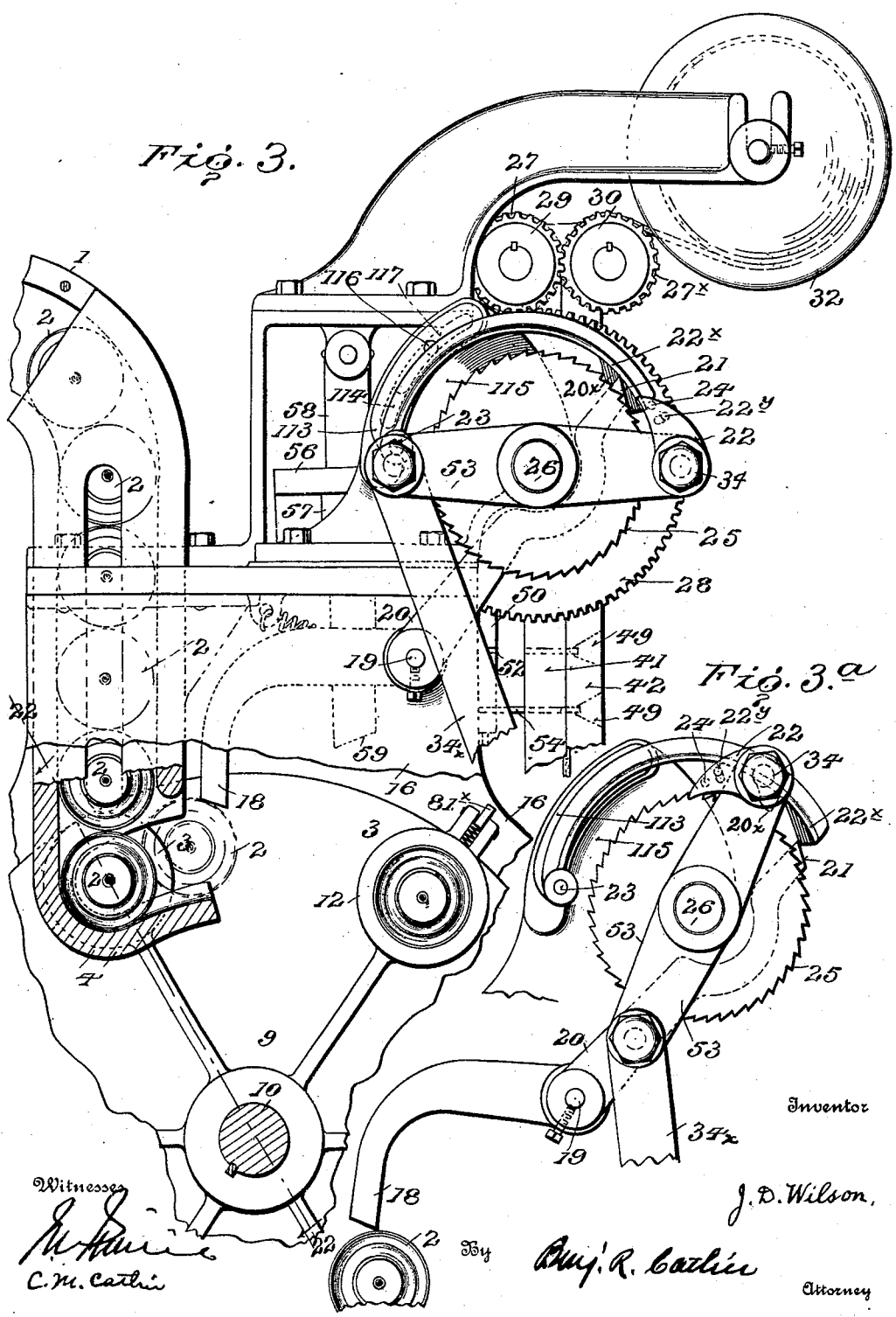

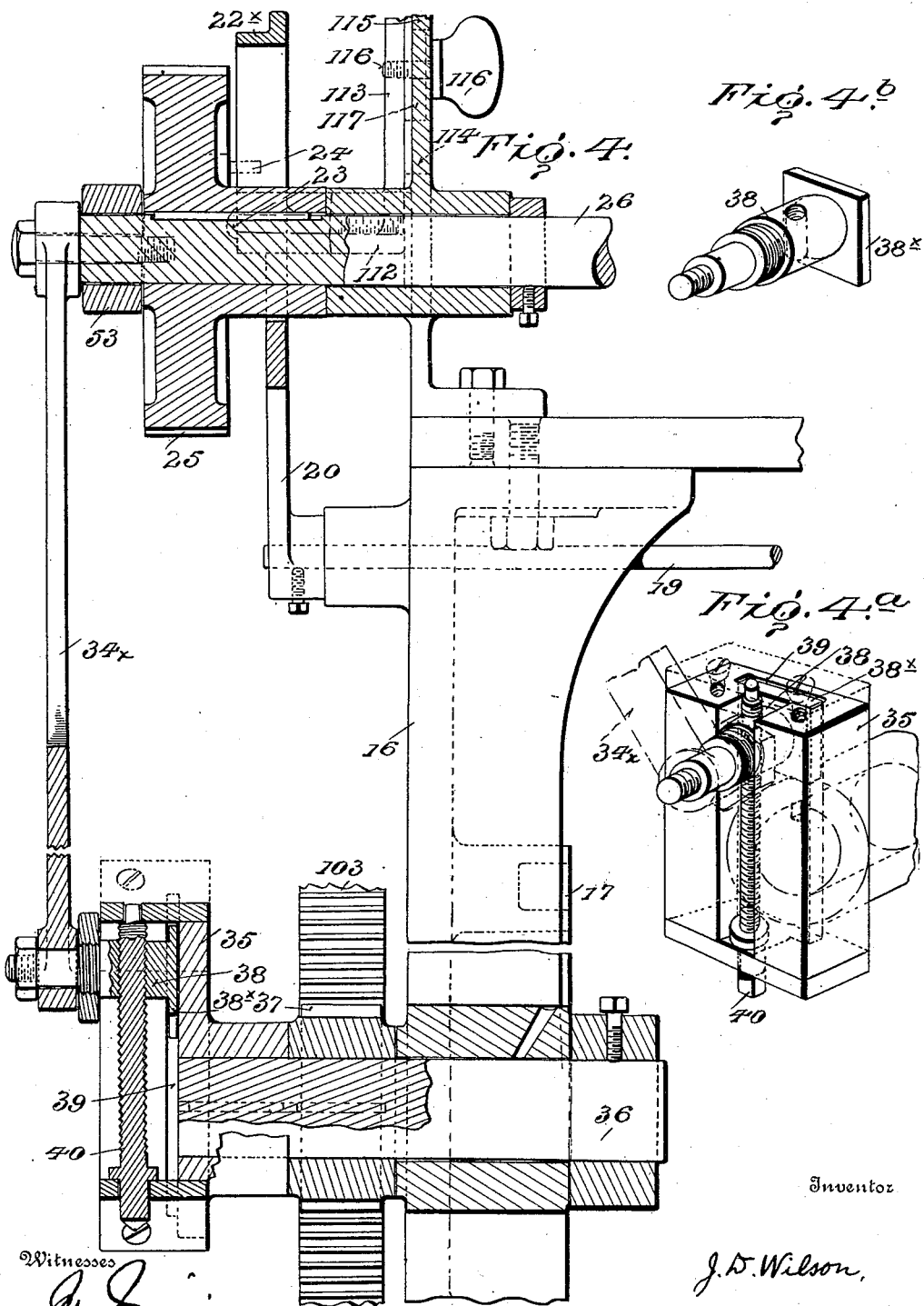

J. D. WILSON.
MACHINE FOR HEMMING CAPS OR DISKS WITH SOLDER.
APPLICATION FILED SEPT. 10, 1907.
992,466.
Patented May 16, 1911.
20 SHEETS—SHEET 5.
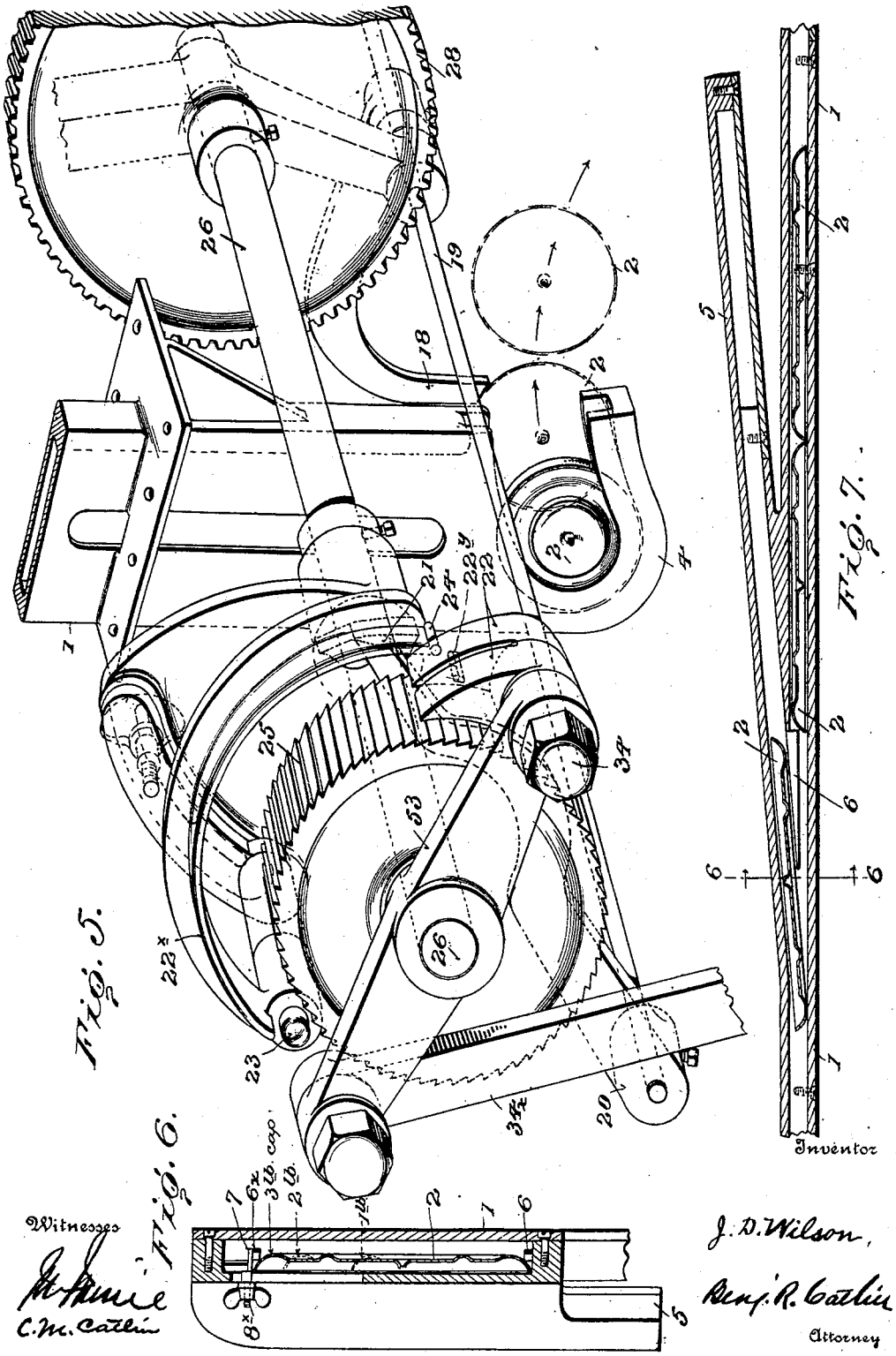
Witnesses
Inventor
J. D. Wilson,
Benj. R. Catlin
Attorney

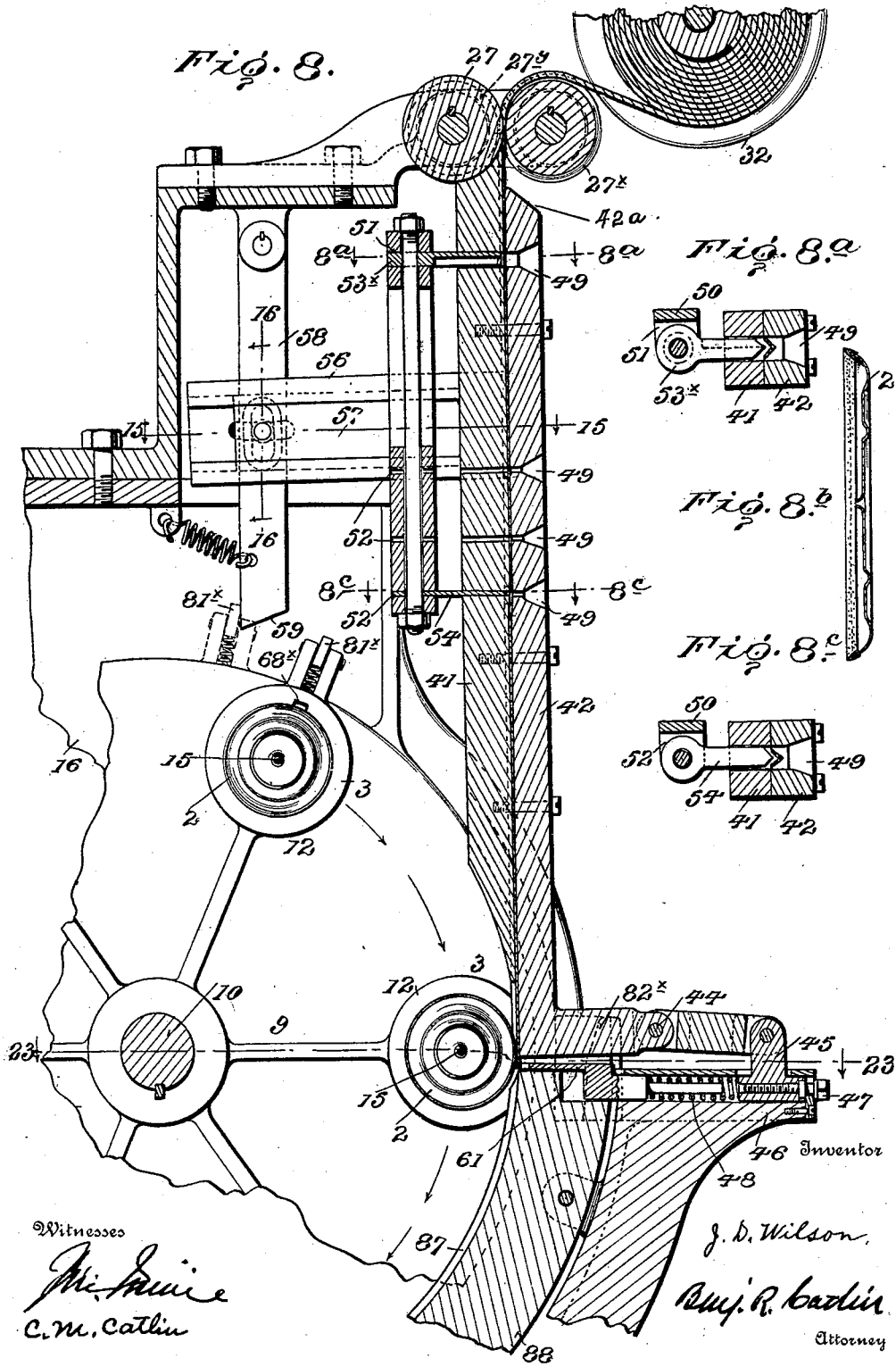

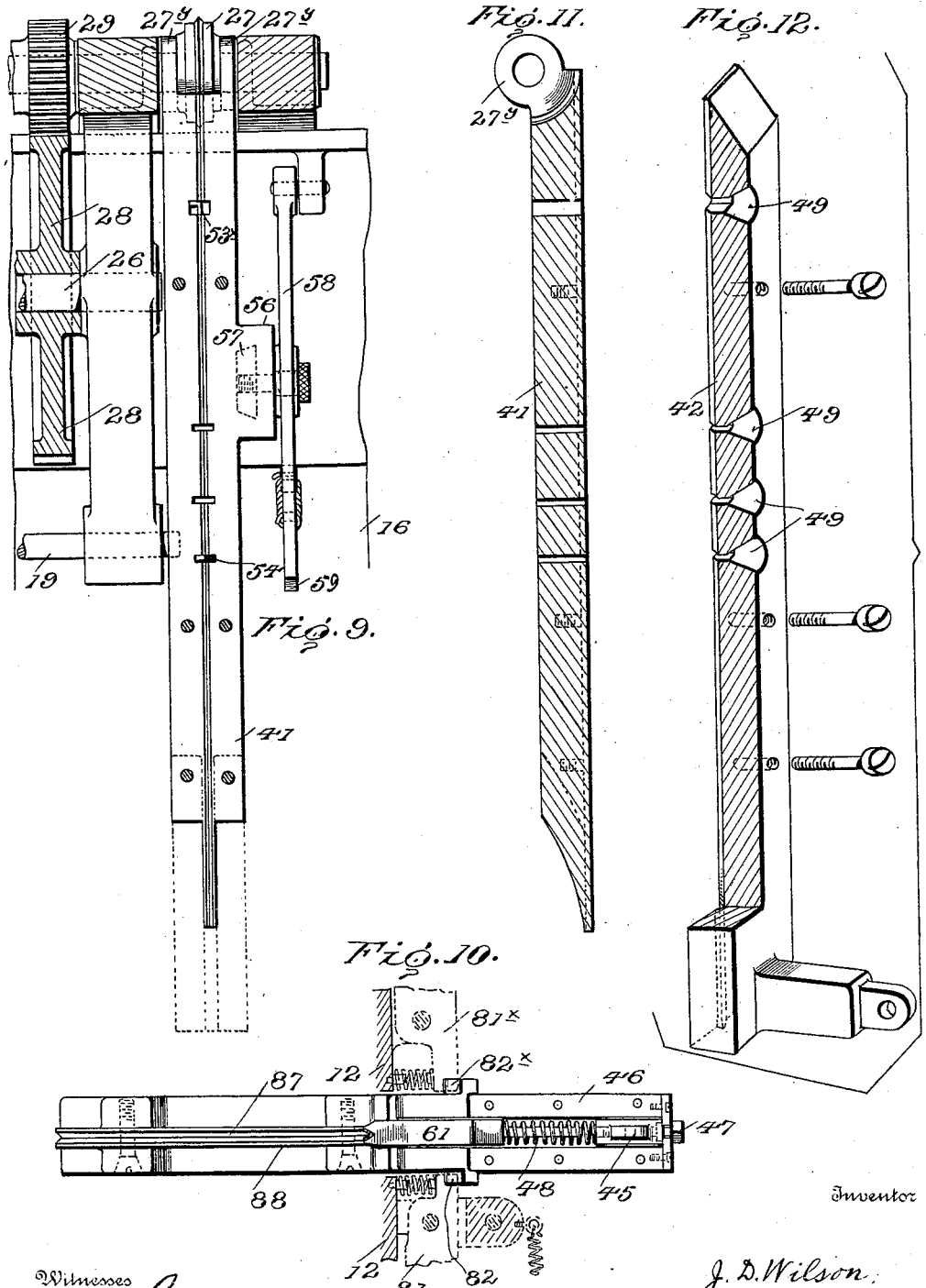

J. D. WILSON.
MACHINE FOR HEMMING CAPS OR DISKS WITH SOLDER.
APPLICATION FILED SEPT. 10, 1907.
992,466.
Patented May 16, 1911.
20 SHEETS—SHEET 8.
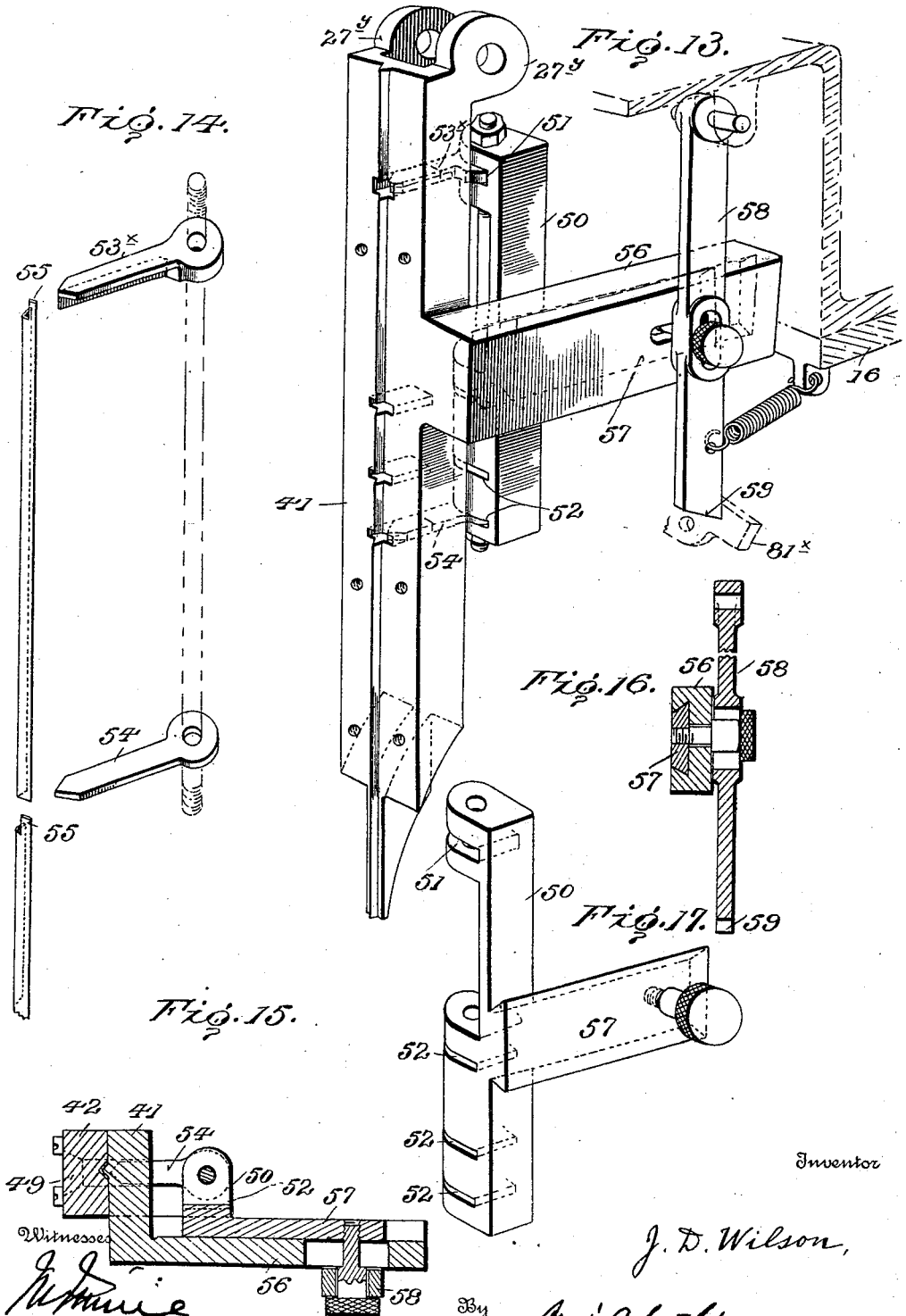

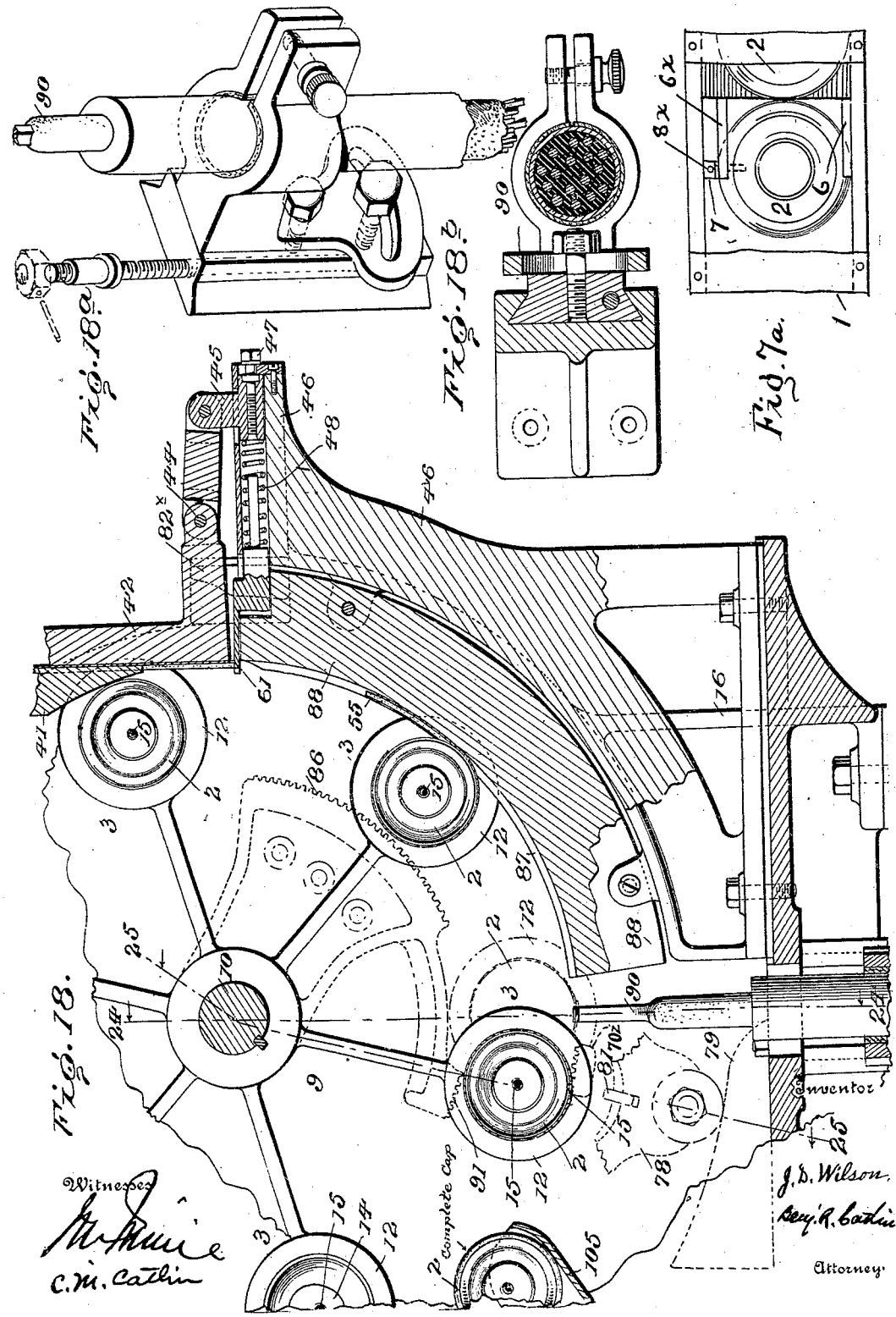

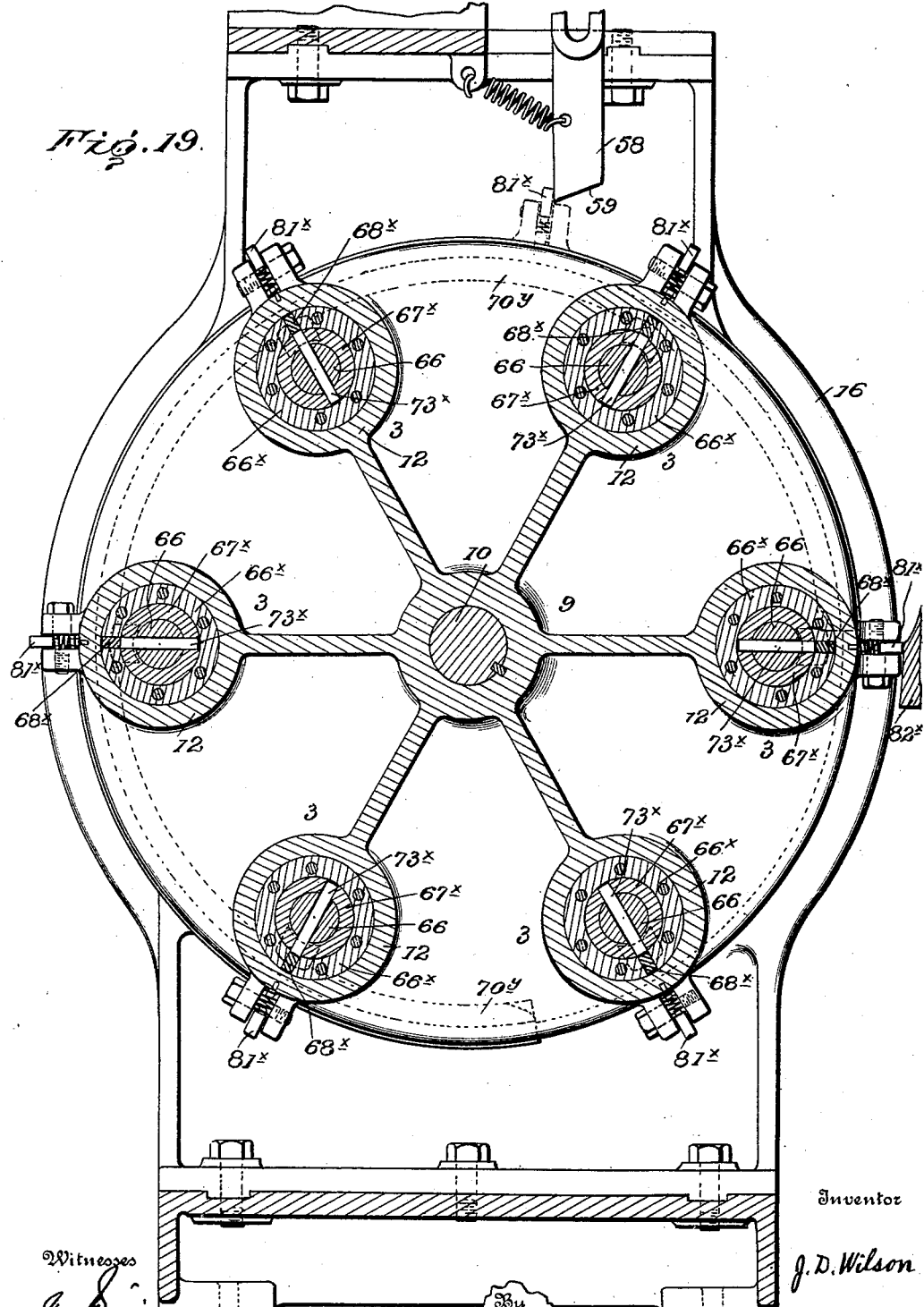

J. D. WILSON.
MACHINE FOR HEMMING CAPS OR DISKS WITH SOLDER.
APPLICATION FILED SEPT. 10, 1907.

992,466.

Patented May 16, 1911.
20 SHEETS—SHEET 11.

Witnesses
C. M. Catlin

Inventor
J. D. Wilson
By
Benj. R. Catlin
Attorney

J. D. WILSON.
MACHINE FOR HEMMING CAPS OR DISKS WITH SOLDER.
APPLICATION FILED SEPT. 10, 1907.
992,466.
Patented May 16, 1911.
20 SHEETS—SHEET 12.
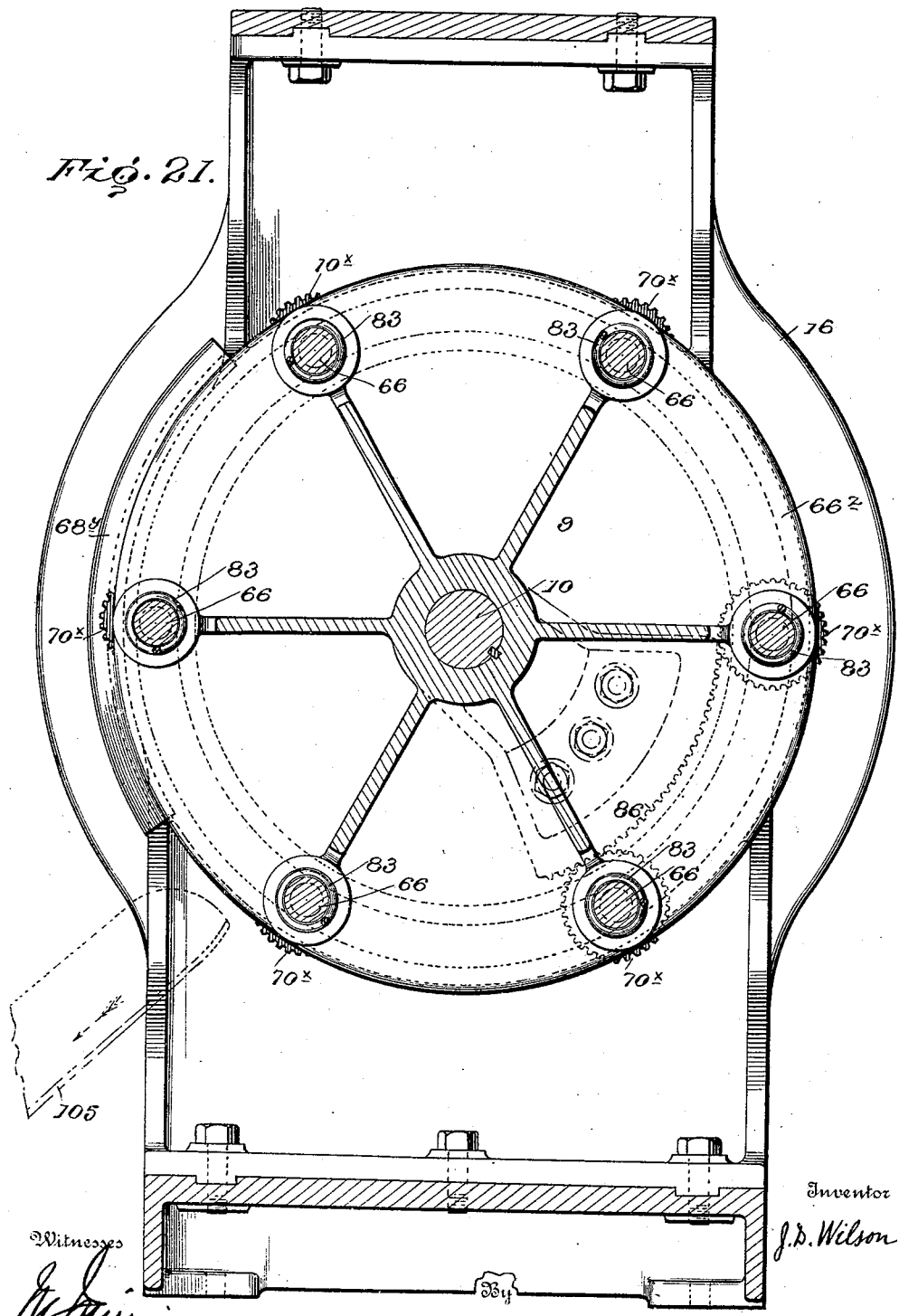

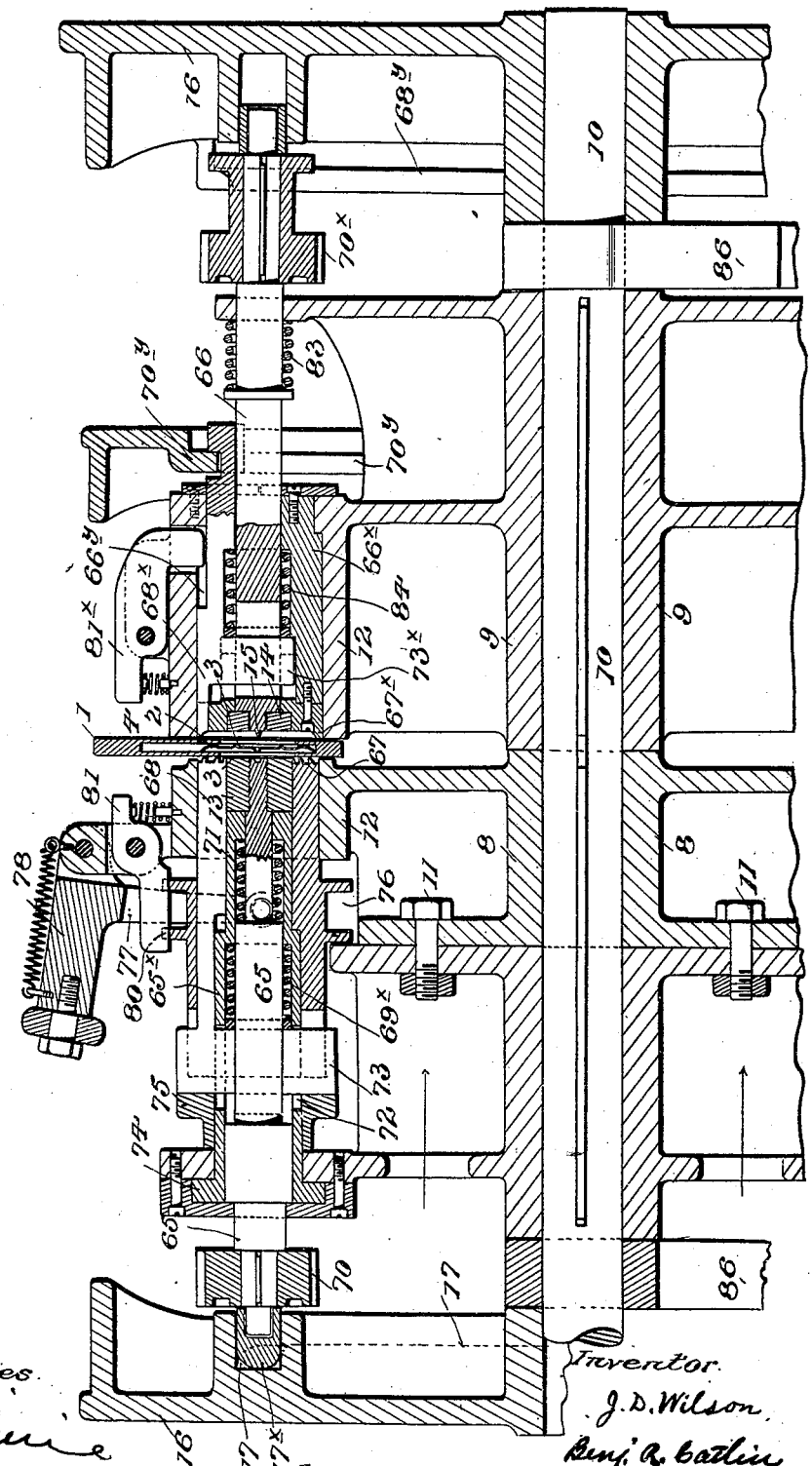

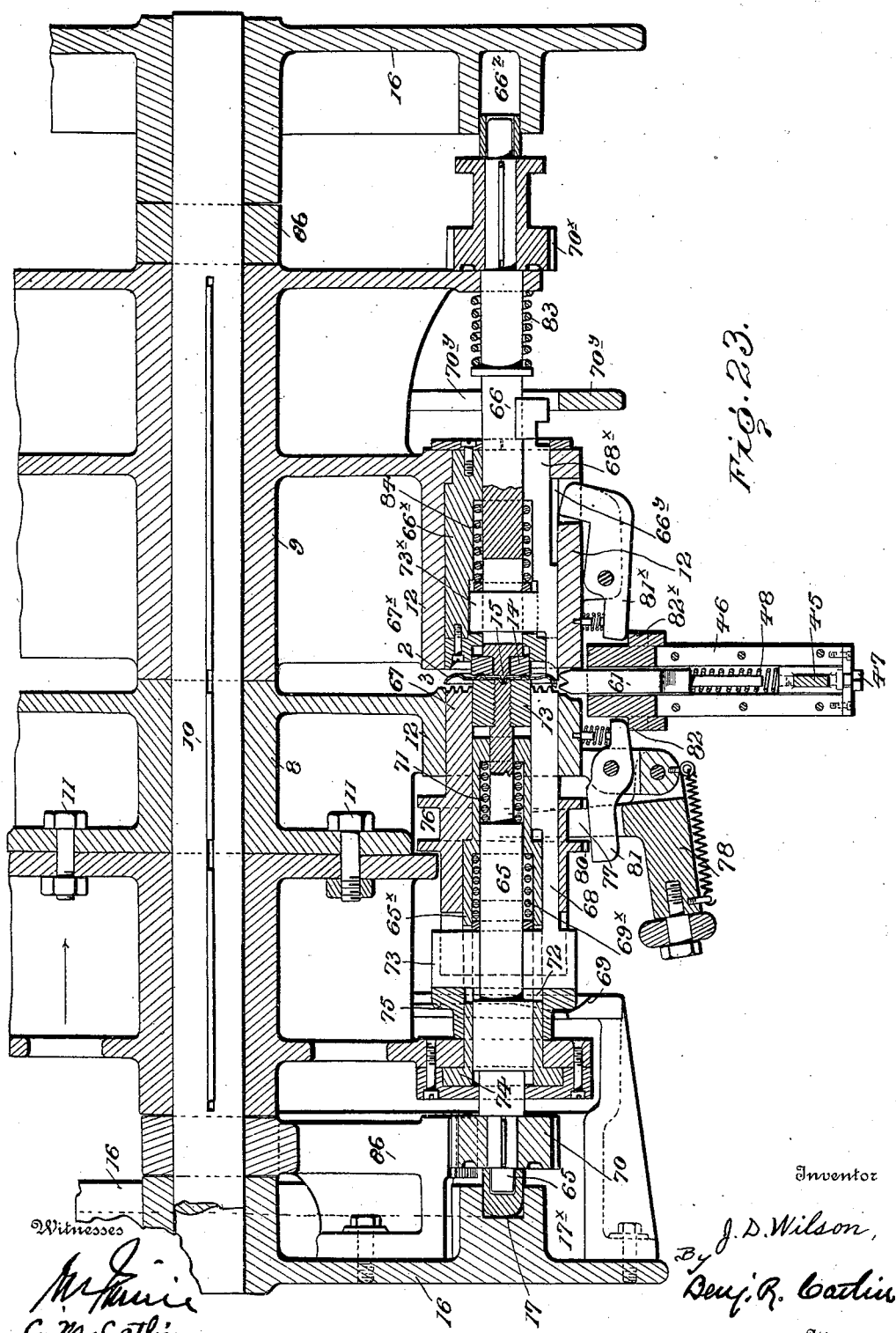

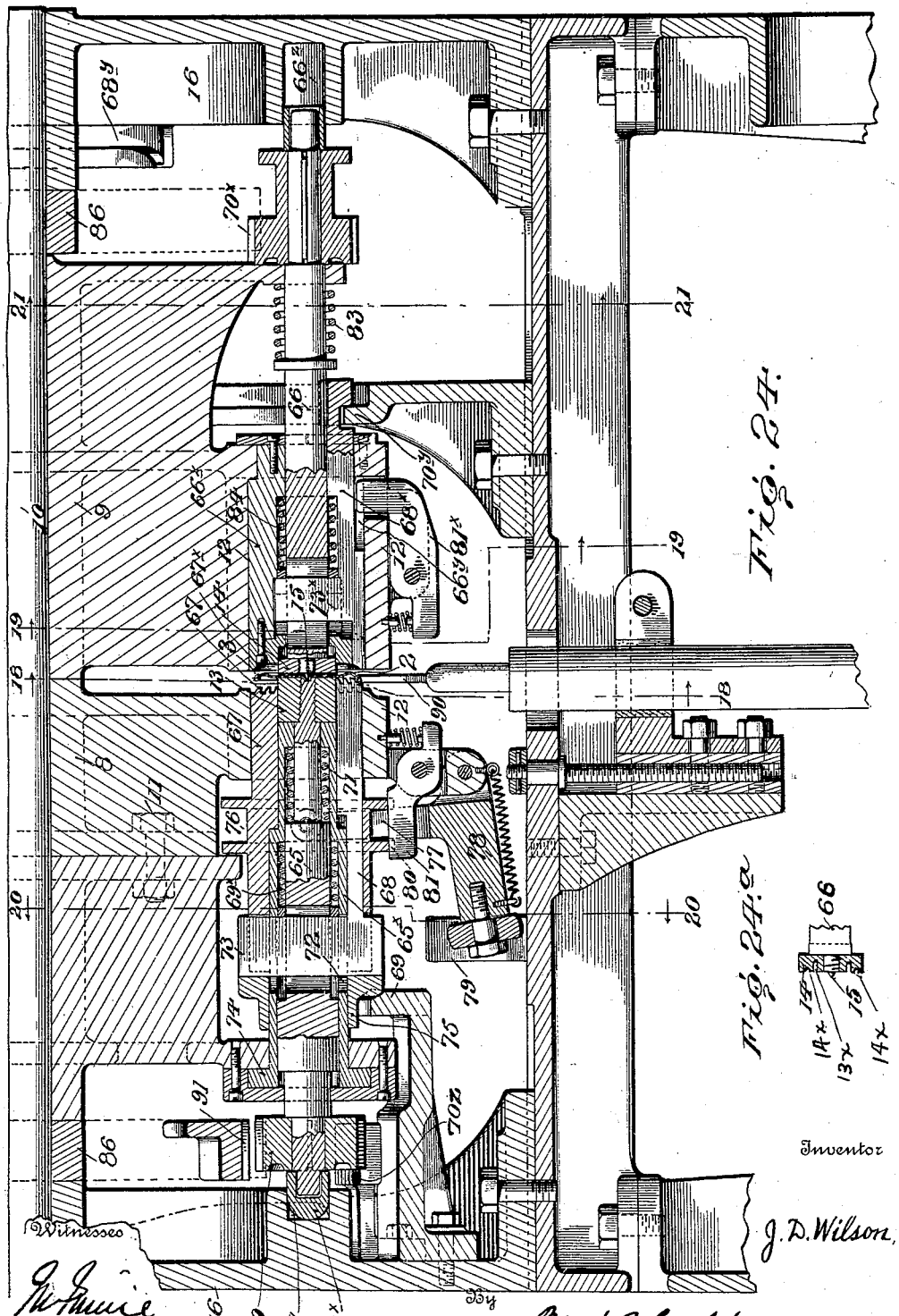

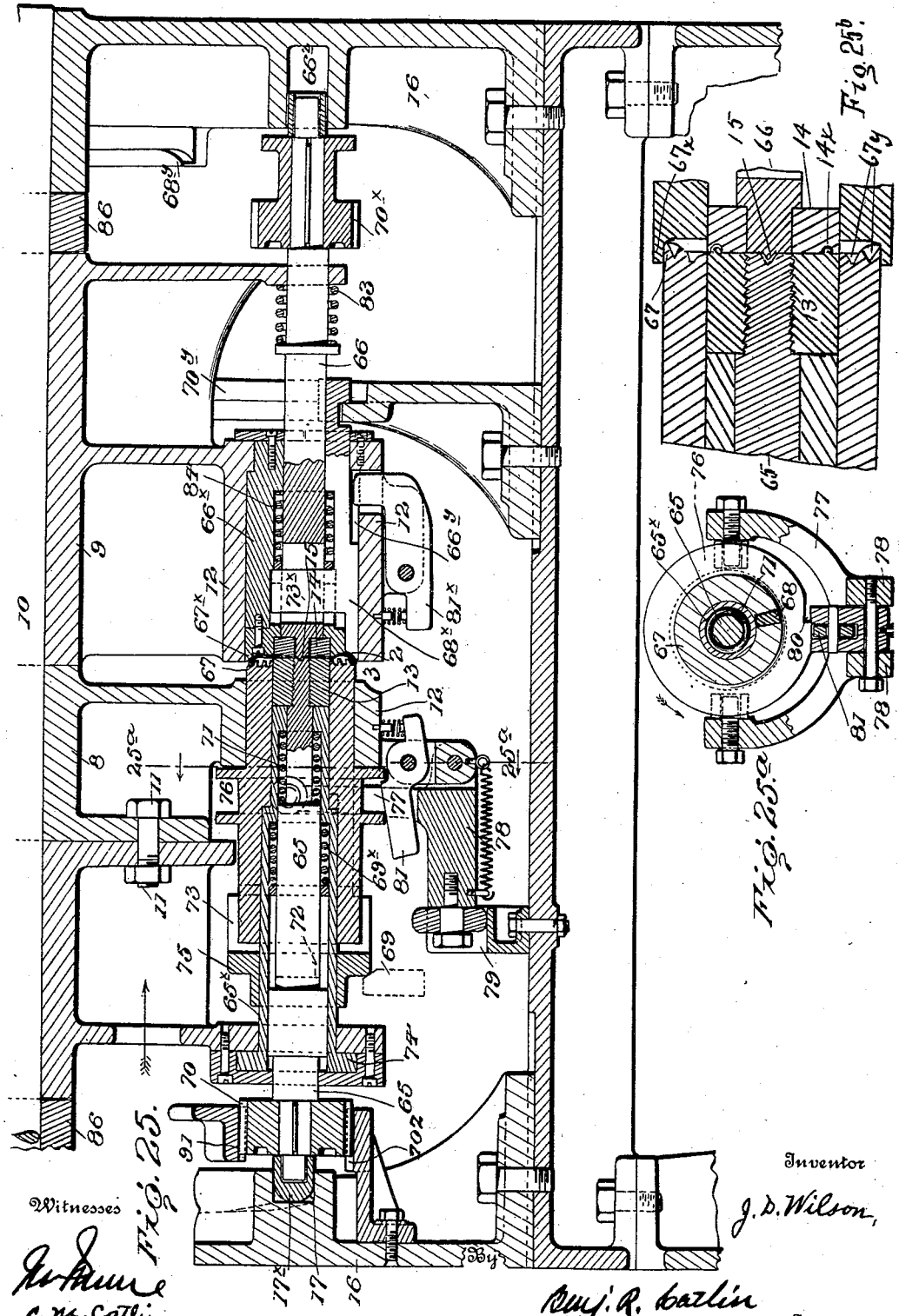

J. D. WILSON.
MACHINE FOR HEMMING CAPS OR DISKS WITH SOLDER.
APPLICATION FILED SEPT. 10, 1907.
992,466.
Patented May 16, 1911.
20 SHEETS—SHEET 17.
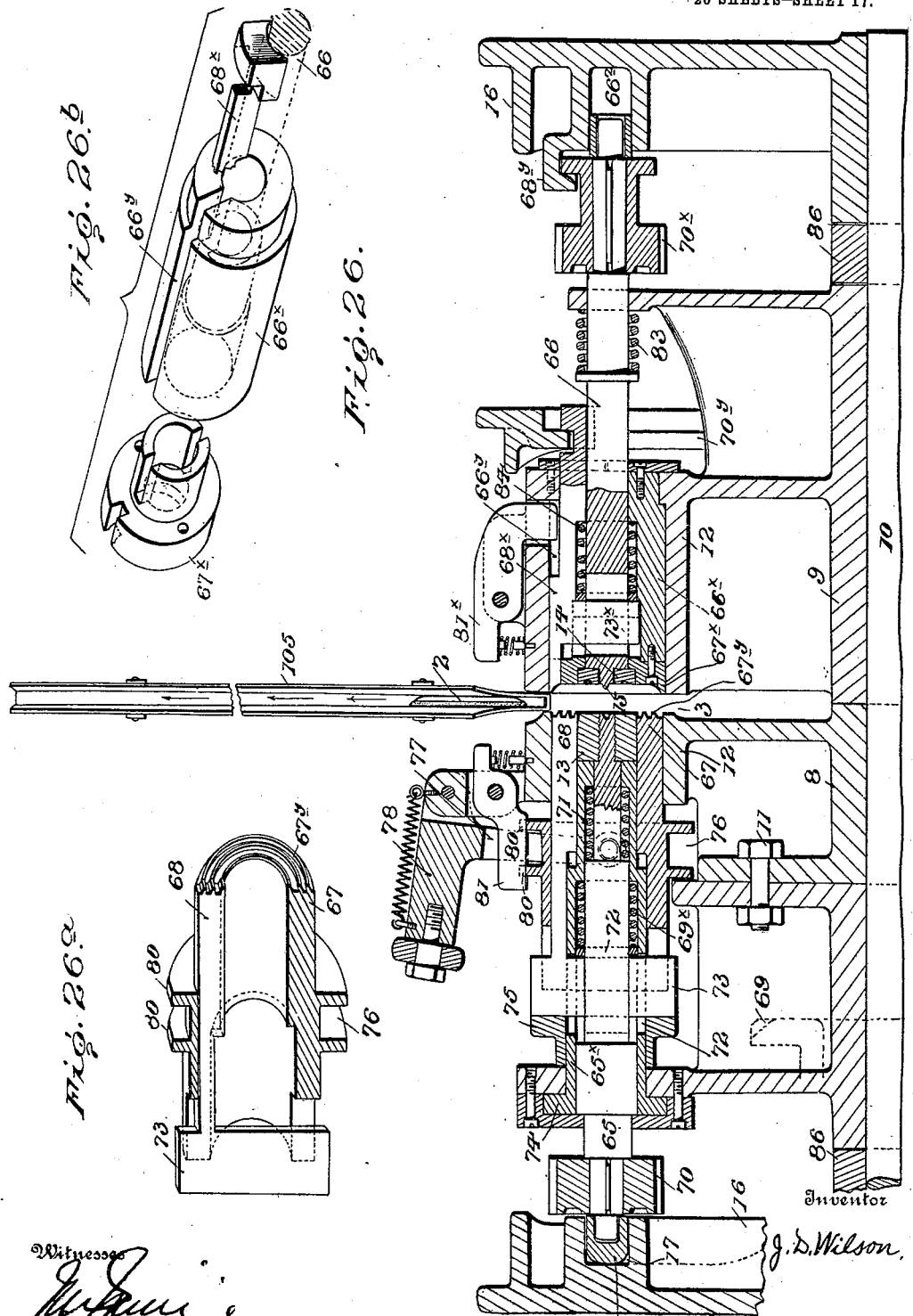

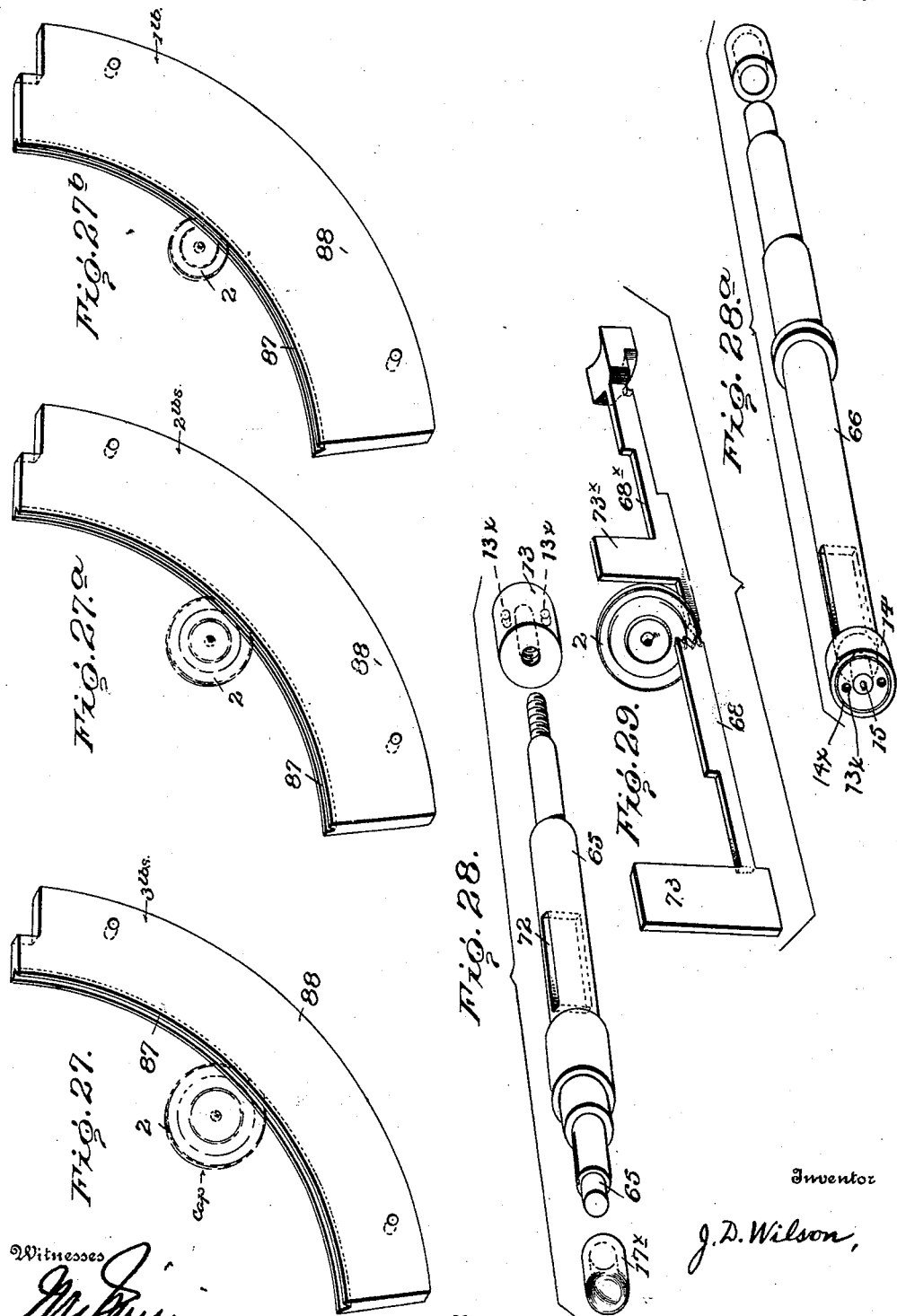

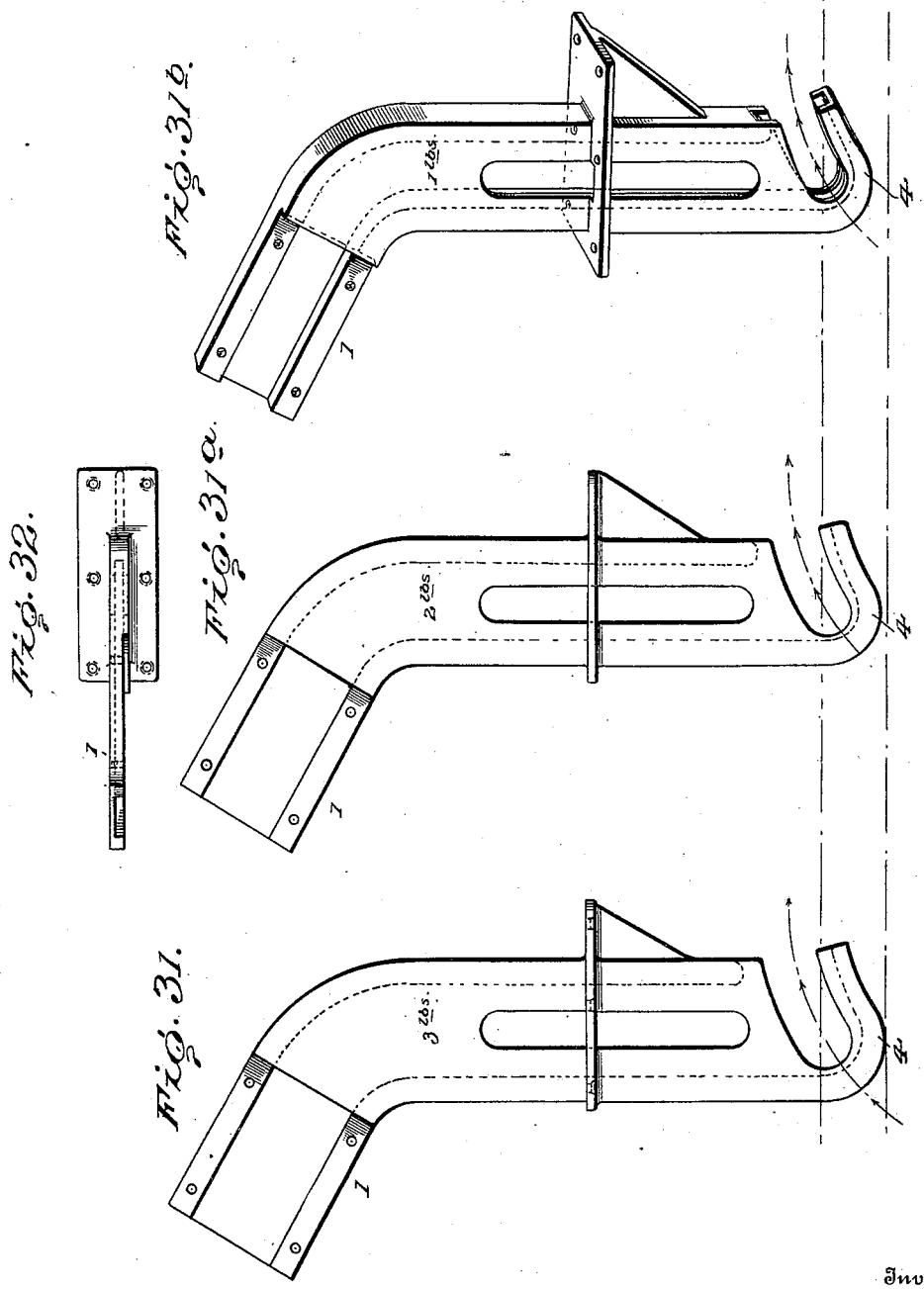

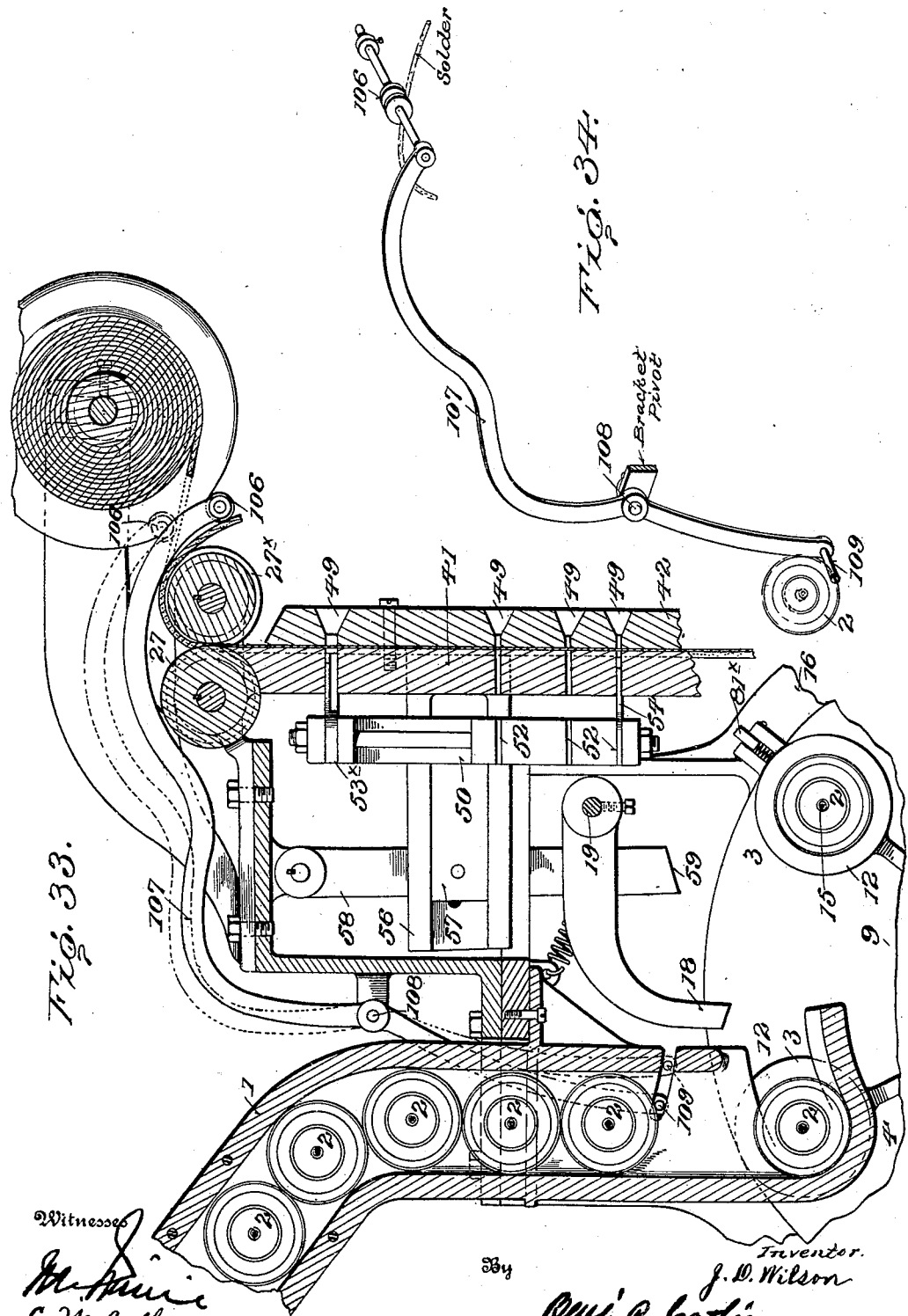

UNITED STATES PATENT OFFICE.

JAMES D. WILSON, OF BALTIMORE, MARYLAND.

MACHINE FOR HEMMING CAPS OR DISKS WITH SOLDER.

992,466. Specification of Letters Patent. Patented May 16, 1911.

Application filed September 10, 1907. Serial No. 392,163.

*To all whom it may concern:*

Be it known that I, JAMES D. WILSON, a resident of Baltimore, in the State of Maryland, have invented certain new and useful Improvements in Machines for Hemming Caps or Disks with Solder; and I do hereby declare the following to be a full, clear, and exact description of the invention, such as will enable others skilled in the art to which it pertains to make and use the same.

This invention relates to machines for hemming with solder, caps or disks such as generally used to close the opening provided in the heads of cans for filling the same. Its object is to increase the capacity and efficiency of such machines, and to secure economy in use of material in the operation which is effected largely by avoiding waste solder and consequent remelting and loss.

The invention consists in the construction hereinafter described and particularly pointed out.

Figure 1:
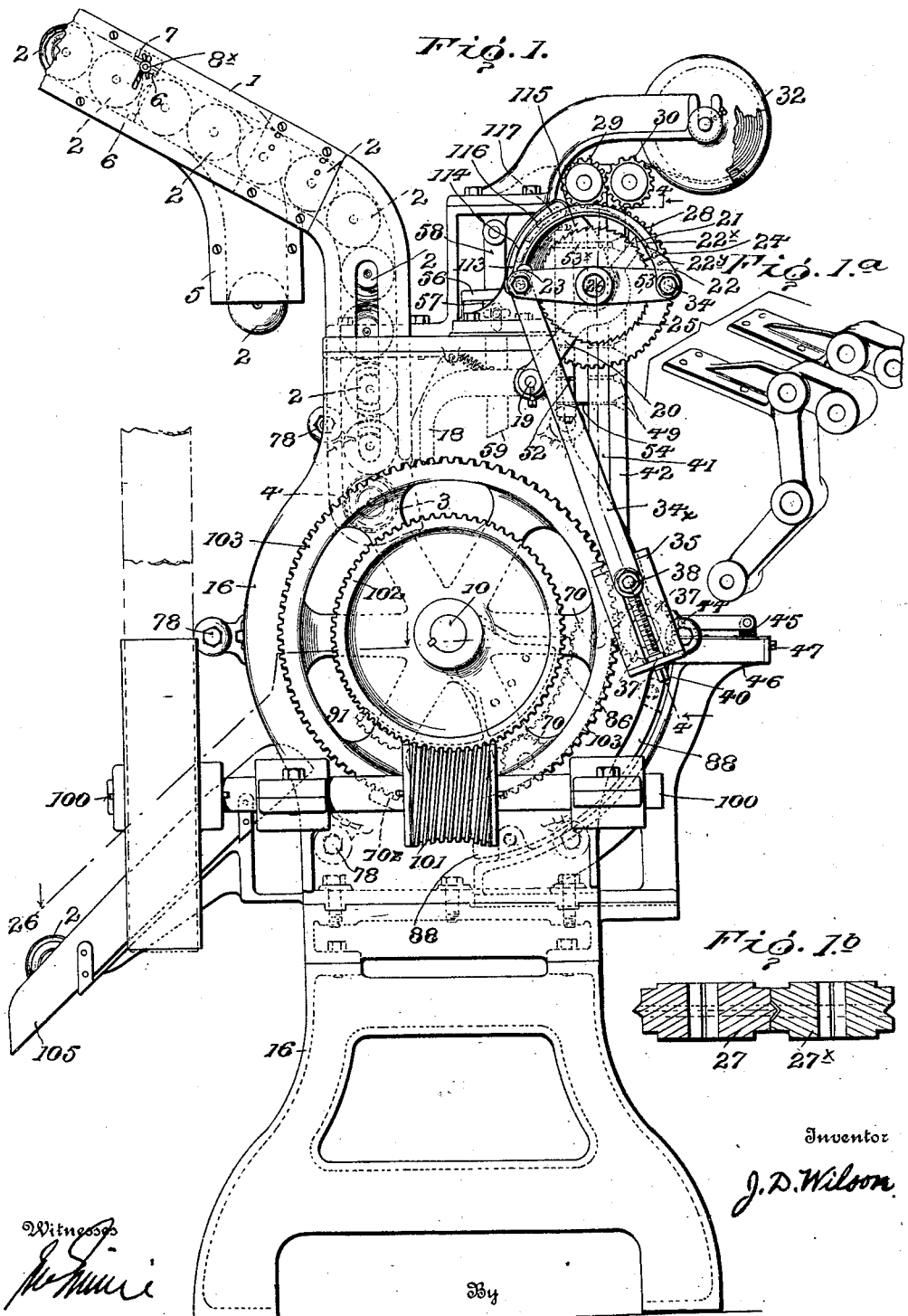
Figure 2:
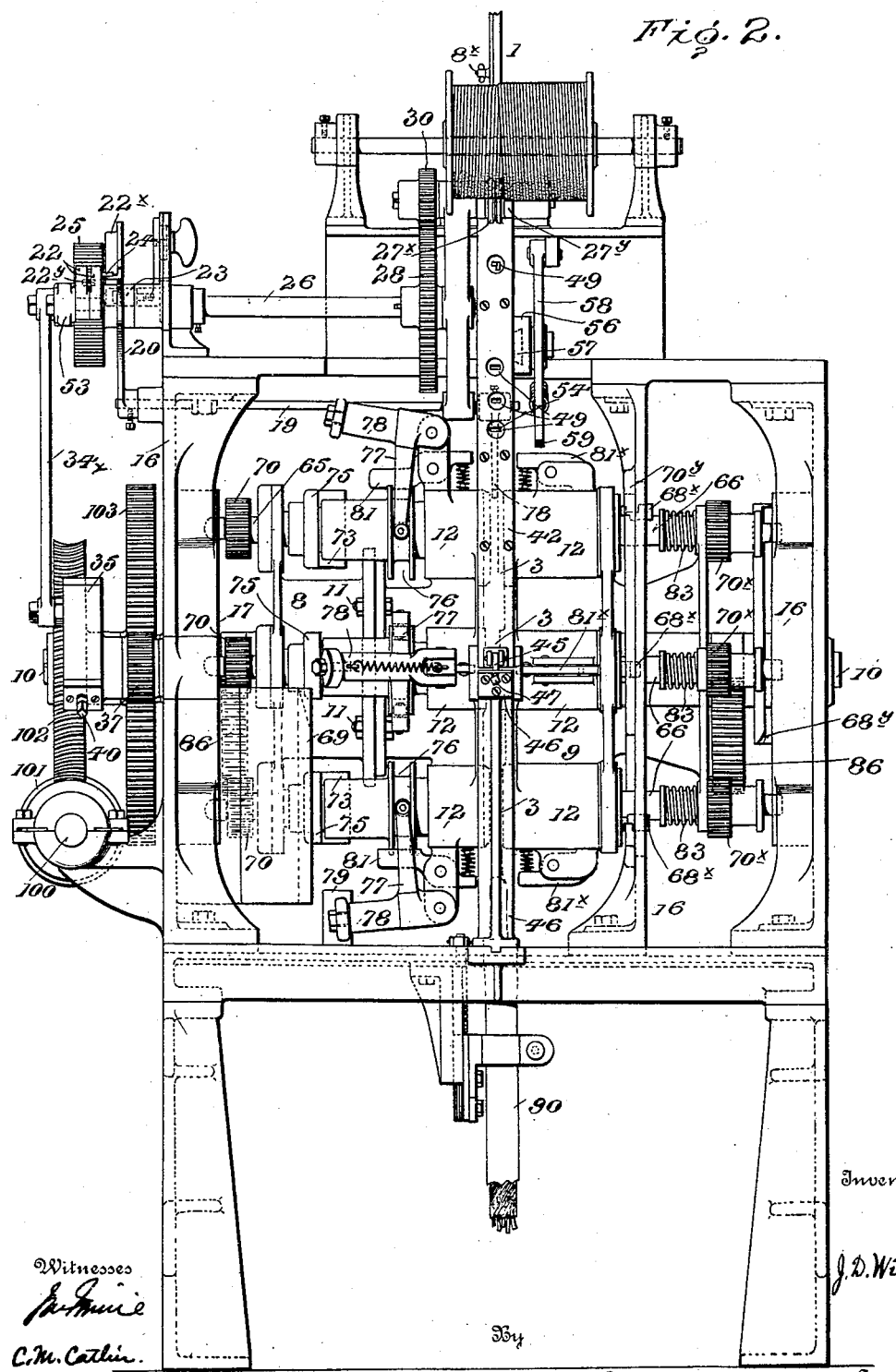
Figure 20:
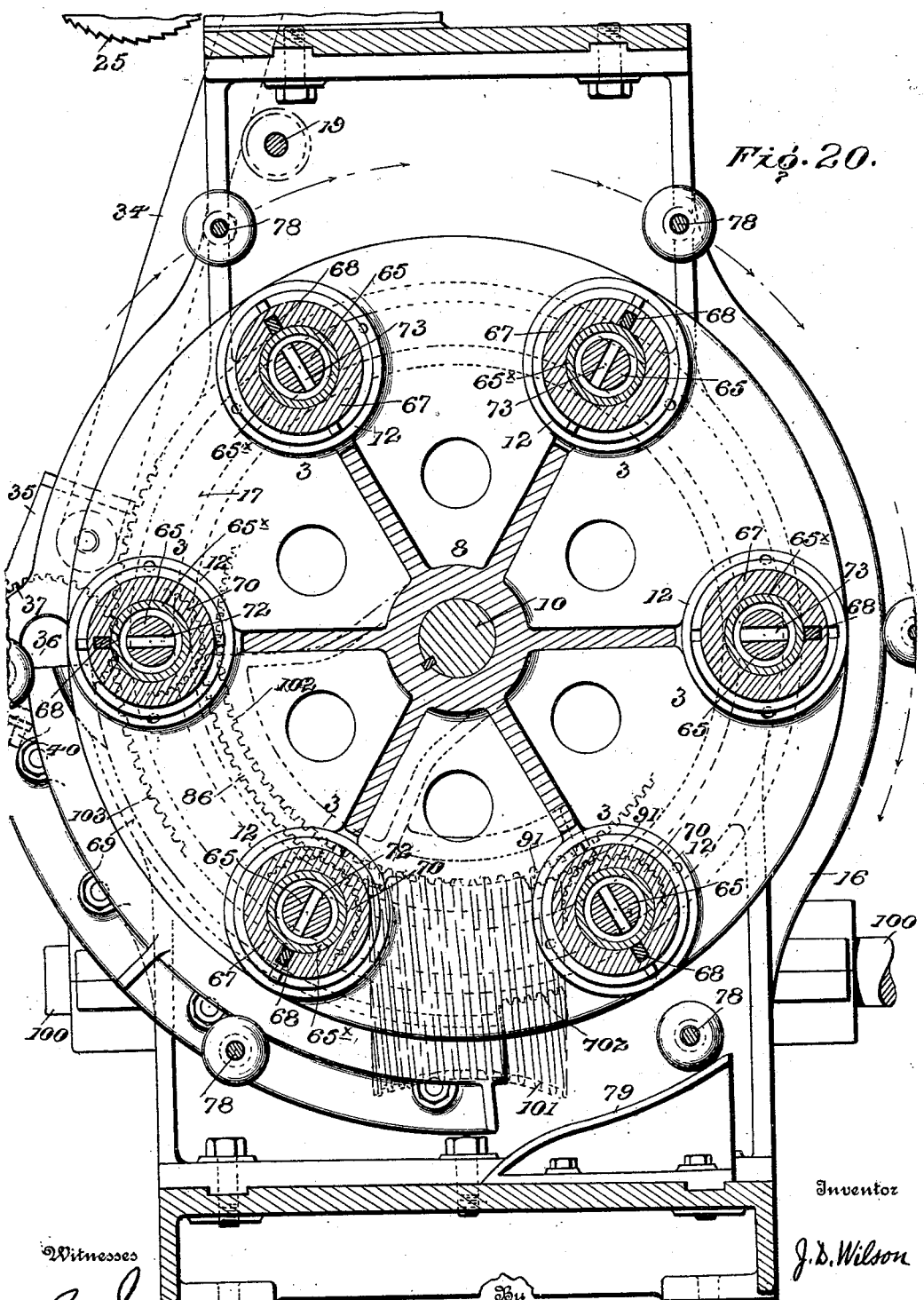

In the accompanying drawings which illustrate the invention and which form part of the specification,—Figure 1 is an end elevation of the machine; Fig. 1ª is a perspective of a die-roll-supporting bracket; Fig. 1ᵇ is a central horizontal section of solder-ribbon-forming die rolls; Fig. 2 is a side elevation taken from the right of the view in Fig. 1; Fig. 3 is an enlarged end elevation showing the cap feeding and ribbon forming and feeding devices parts being broken away; Fig. 3ª is an elevation showing pawl-operating and controlling devices; Fig. 4 is a section on line 4, 4 of Fig. 1; Fig. 4ª is a perspective of an adjustable crank-arm-connection for a pawl-operating connecting rod; Fig. 4ᵇ is a perspective of a connecting pin or block detached; Fig. 5 is a perspective showing the cap-feeding device and mechanism for controlling the ribbon-forming and ribbon-feeding devices; Fig. 6 is a section on line 6, 6 of Fig. 7; Fig. 7 is a partial longitudinal section of cap-feeding and switch chutes; Fig. 7ª is a partial side view of the chute with the near side broken away; Fig. 8 is a partial section taken through ribbon-forming dies and a ribbon-guide; Fig. 8ª is a section on line 8ª, 8ª of Fig. 8; Fig. 8ᵇ is a central section of a hemmed cap; Fig. 8ᶜ is a section on line 8ᶜ, 8ᶜ of Fig. 8; Fig. 9 is an elevation showing a male die and a male member of a ribbon guide; Fig. 10 is a plan of a ribbon rest or shelf adjacent parts also being indicated; Figs. 11 and 12 represent respectively longitudinal sections of male and female members of a ribbon guide; Fig. 13 is a perspective of a male member of a ribbon guide, a blade holder, and a blade operating device; Fig. 14 is a perspective of two blades and a solder ribbon cut thereby; Fig. 15 is a section of a ribbon guide, knife holder and slide on line 15, 15 of Fig. 8; Fig. 16 is a section of the slide-operating member on line 16, 16 of Fig. 8; Fig. 17 is a perspective of a knife holder and slide; Fig. 18 is a partial vertical section through the ribbon shelf on line 18, 18 of Fig. 24; Fig. 18ª is a perspective of a solder-melting device, and Fig. 18ᵇ is a transverse section of the same; Figs. 19, 20 and 21 are respectively sections on lines 19, 19; 20, 20; and 21, 21 of Fig. 24; Fig. 22 is a section through a cap carrier and center cap-clamping and hemming devices, a cap being situated in the foot of a chute and about to be clamped by the clamping device; Fig. 23 is a similar section just prior to clamping the foot of a solder ribbon to a clamped cap, section being on line 23, 23 of Fig. 8; Fig. 24 is a similar section on line 24, 24 of Fig. 18, showing the solder melting device in situation to melt the overlap of a solder hem on a cap; Fig. 24ª is a partial central section of a modified arrangement of one clamping block; Fig. 25 is a similar section on line 25, 25 of Fig. 18, parts being in position for smoothing the solder on a hemmed cap; Fig. 25ª is a section on line 25ª of Fig. 25; Fig. 25ᵇ is an enlarged partial longitudinal section of the dies and clamping blocks; Fig. 26 is a section on line 26, 26 of Fig. 1, showing position of parts as a completely hemmed cap is discharged; Fig. 26ª is a longitudinal section through a male hemming die, showing in full lines a solder-clamp member; Fig. 26ᵇ is a perspective of a female hemming-die member and its supporting sleeve detached; Figs. 27, 27ª and 27ᵇ respectively represent solder-spinning-guide dies for three, two and one pound can caps; Fig. 28 is a perspective of a clamp spindle its terminals being detached; Fig. 28ª is a perspective of another clamp spindle, one of its terminals being detached; Fig. 29 is a perspective of a cap and a solder clamp; Fig. 30 is an end elevation of a cap-feeding chute and its foot;

Figs. 31 and 31ª are side elevations of the same; Fig. 31ᵇ is a perspective of the same; Fig. 32 is a plan of the same. Fig. 33 is a partial sectional view showing means to arrest the feeding of caps; Fig. 34 is a perspective view of a lever detached.

Numeral 1 denotes a chute by which caps having a curved rim and of the general form indicated by 2 are delivered to cap-clamping devices 3, six in number in the present instance though but one is fully shown, the relative situation of others being merely indicated and parts omitted in the drawings for sake of clearness, all of such clamping devices being similar. Caps such as indicated are placed in the mouth of the chute with their rims turned toward the operator feeding them in and roll by gravity or are forced down onto foot 4 of the chute. To avoid obstruction and delay that might be occasioned by a cap inadvertently introduced with its rim wrongly directed, a switching chute 5 is provided.

6 denotes a cap-guiding flange or switch point above or adjacent the mouth of the switch chute 5 and in the path of the cap rim to direct the caps if properly introduced into chute 1, or if misplaced, into the switch chute. Caps properly placed as those two shown at the right of Fig. 7 may be assumed to have been, will roll past this flange or switch point, which however will engage the rim of any cap fed to the chute with its edge directed toward the switch flange and thereby guide it into the switch chute. In Fig. 7 two caps are shown at the right as having been properly introduced, and as having passed the switch point 6, and continued on their proper course in chute 1. At the left of said figure, and in Fig. 6, is shown a cap that was so introduced into chute 1 that it has been diverted by said switch point and sent on its way to chute or branch 5. The point or rib 6 is fixed in the bottom side of chute 1 and engages the rounded rim of the cap, the transverse dimension of the chute being such as to insure directing the cap either to the switch chute or to the main chute according as said rim is on one side or the other of the rib, as clearly indicated in Fig. 6. If in any case it is thought necessary for greater certainty of action a switch point adjusting piece or part 7 may be provided opposite the switch point or flange 6, a switching point or part 6ˣ, similar to the opposite one at 6, being fixed to part 7, and placed as shown. By means of an adjusting screw 8ˣ the distance between the switch carrying part 7 and the bottom of the chute can be regulated to equal the diameter of caps of any required size whereby it is insured that caps can not ride upon or jump over a switch flange, but must either follow the main chute or enter the switch chute according to which side of the switch point or flange is engaged by the rounded back of the cap rim. The foot 4 of the main chute is curved substantially as represented and is by preference situated between sections 8 and 9 of a cap-carrier and within its periphery.

The cap-carrier sections are splined on a shaft 10 which has bearings in the frame and are held in endwise contact by the frame. Section 8 for convenience in assembling is made in separate parts connected as indicated at 11. To the carrier sections are secured sleeves, holders or pockets 12 in which are rotatably supported cap-clamping devices comprising cylindrical blocks 13 and 14. The block 13 preferably has on its face one or more annular ribs or grooves similar to the bead usually found in caps and adapted to hold and center the cap when clamped. On the end of a supporting stud for the other or co-acting clamp block 14 is a pin 15 which enters a central ventilating opening in the cap. The carrier sections are held together endwise by standards or parts 16 of the frame in which shaft 10 has its bearings. Upon these standards are supported cams 17 and 68ʸ which actuate the clamp blocks. The clamping begins upon a cap supported on the chute foot 4, the cams being suitably shaped to effect the clamping gradually and smoothly.

The clamped cap is carried by the continuous rotation of its carrier against the end of an arm 18 fixed on a rocking shaft 19, said end being shaped substantially as illustrated whereby it is lifted to permit the cap to pass and to rock the shaft and depress an arm 20 fixed thereon and provided with a face 21 whereby a pawl guide 22ˣ pivoted on a stud 23, is moved upwardly to permit the escape of pin 24 fixed on a pawl 22 having in the present instance two members connected by a pin 22ʸ fixed to one and entering a small slot in the other.

20ˣ is a stop for arm 20. The engagement of the stop with the arm is shown in broken lines in Fig. 5. It is also shown in Fig. 3, the stop being indicated in full lines, and in Fig. 3ª, the lever 20 is in situation to move against the stop, both parts being indicated in broken lines.

The pawl is reciprocated to drive a ratchet wheel 25 fixed on a shaft 26 which through the medium of a gear 28 drives gears 29 and 30 operatively connected to which gears 29 and 30 are fixed rotary dies 27 and 27ˣ for forming a ribbon or band of solder from solder wire applied from a suitably supported spool 32. The dies 27, 27ˣ are constructed and mounted so as to reduce the thickness of solder constituting the wire and at the same time give it its channel form. As shown, the male die tapers to a sharp edge where it acts on the wire and operates to partly split or divide the material of the wire in reducing and shaping it to final form, and the female die is of corresponding shape. When the male die acts directly on the middle axial plane of the wire the width of the sides of the channeled solder ribbon will be equal, but this is not essential, as a slight variation to one side or the other of such middle plane might in some cases not be objectionable. One advantage of the described mode of forming the channel solder ribbon is that owing to the force and manner of operation of the dies on the wire it gives a ribbon with straight edges without trimming them, even when the wire is not entirely straight, because the cutting or splitting edge of the male die forces the wire into the V of the female die and thereby forces any bends existing in the wire toward the plane of the angle of the V of said female die and obliterating the bends from the finished ribbon. When flat ribbons are made and then bent up, unless they are trimmed, objectionable irregularities are frequently found to exist in the edges, and these I avoid. In operation the pawl normally engages the under face of the pawl guide and raises it out of the path of a pawl detent pin 24 whereupon the pawl gravitates, or is forced by a spring if necessary, into engagement with the ratchet wheel. In case no cap is fed to the continuously running cap-carrier the arm 18 is not moved and the pawl is in such case supported out of engagement with the ratchet wheel by means of the pin 24 which rides upon the upper side of guide $22^x$ thus suspending the operation of forming the solder ribbon. The pawl is actuated by means of a reciprocating bar 53 pivoted on shaft 26 and connected to the pawl by a bolt 34 and to a crank arm 35 fixed on a shaft 36 by a connecting rod $34^x$ connected to arm 35 driven by the medium of its pinion 37. The rod and arm are connected by an adjusting block 38 guided by means of a flange $38^x$ running in grooves 39 in the arm. The block is moved to vary the effective length of the arm by a screw 40 engaged therewith and is itself held from lengthwise movement as shown. This adjustment provides for suitable movements of the pawl, ratchet wheel and connected driven parts, to meet the requirements of caps of different sizes, as for example, caps suitable for one, two or three pound cans.

To conduct the ribbon toward the cap clamps, a guide comprising a male member 41, and a female member 42 is provided. The members of this guide are connected by screws as shown. The upper end of one of the guide members, as 41, is shaped substantially as shown whereby it is held contiguous the proximate point of the dies and strips the ribbon therefrom as soon as formed. The stripping-guide-terminal of a guide member is placed on the side on which the ribbon is disposed to follow the die; the other guide member is cut away at the top as indicated at $42^a$. The ribbon guide is pivotally supported on the axis of the male die 27 by means of ears $27^y$ offset from the male guide member. On the lower end of guide member 42 is a rod 44 which by a link is pivotally connected to a stud 45 adjustably held in a bracket 46. An adjusting screw is indicated by 47 and 48 is a spring resisting the screw. The ribbon guide can be adjusted about its support at $27^y$ to carry its delivery end to a point suitable for connecting a ribbon section with a cap of given size. The adjustment indicated corresponds to the largest sized cap.

The ribbon situated in its guide is cut into suitable lengths by blades passing transversely through the guide and discharging any slight waste of the cutting operation at waste outlet 49. These blades have each its cutting edge shaped to the form of the ribbon, which in the instance illustrated is V-shaped in cross section, except that the upper blade is modified to notch the section end.

50 indicates a blade holder provided with slots 51 and 52 to receive and hold the blades for cutting from a solder ribbon sections for hemming caps. The upper blade $53^x$ cuts off a section and a lower blade 54 trims it to the precise length required to hem a cap of given size. Several slots 52 permit adjustment of this blade as may be required by caps of different sizes. The upper blade not only severs a section from the ribbon but notches or cuts out a piece of one of its sides to provide an overlapping end 55 to facilitate uniting the ends of a section when overlapped on the cap. The blade holder is adjustably supported in an arm 56 fixed to the guide member 41, by means of a slide 57 movably held in the arm by a thumb screw passing through slots in the pendent bar 58 and arm whereby vertical and horizontal adjustments can be effected. The pendent bar 58 has its upper end pivotally supported in the frame and its foot 59 in the path of latches $81^x$ carried by the sleeve holders 12. The rotation of the cap-carrier to which the sleeve holders are fixed carries, at the proper time, the axial part of a latch against the pendent bar at 59 and moves the blade holder to actuate the knives. A section of the solder band or ribbon thus cut descends upon a narrow shelf 61, by preference formed at its end contiguous the solder similar to a cross section of the ribbon. This shelf slides in a slot in a way in the bracket 46. It is held in an operative situation by a spring 48 and is moved out of the path of a solder section by the action of a solder clamp to be described.

65 and 66 denote two series of spindles each of which is supported in the frame to be either rotated or moved lengthwise as required. Each spindle 65 has a sleeve 65ˣ, and each spindle 66 a sleeve 66ˣ. The spindles of the two series are alined endwise and have on their proximate ends cap-clamping blocks 13 and 14 respectively. The end of spindle 65 is screw threaded to receive block 13, and preferably the end of spindle 66 is smooth to support block 14 rotatably thereon; but in some cases the end of spindle 66 may be screw threaded, as in Fig. 24ª. When a block (13 or 14) is to be screwed onto its support it is provided with spanner holes 13ˣ.

14ˣ is a centering groove.

67 and 67ˣ denote hemming dies. Preferably die 67 comprises a sleeve in one end of which are formed annular die ribs 67ʸ the respective ribs corresponding in diameter to different size caps, whereby die 67 need not be changed when different size caps are hemmed. The coöperating die 67ˣ is removably secured to its sleeve 66ˣ and is replaced by a similar die of less diameter when smaller caps are to be hemmed. The solder clamp member 68 has ribs corresponding in position to ribs 67ʸ to accommodate different size caps. Member 68ˣ is replaceable for different size caps.

68 and 68ˣ are solder clamps movable endwise in slots in the hemming dies. At the outer or rear end of solder clamp member 68 is a cam 69 supported in or from the frame standard 16 in the path of the clamp and adapted to move it to clamp the solder on the edge of a cap.

69ˣ denotes a solder-clamp-returning spring.

The spindles are rotated by means of pinions 70 and 70ˣ splined or otherwise secured thereon. The spindle 65 is moved endwise to effect clamping of the cap between the clamp blocks or heads 13 and 14 by means of a cam groove 17 situated in or fixed to a standard 16. An anti-friction roller is denoted by 17ˣ. Spindle 65 has a shoulder against which bears a spindle-returning spring 71. Extending through the spindle is a slot 72 to loosely receive an arm or key 73 of solder-clamp-member 68 which is normally held in retracted position by spring 69ˣ, there being preferably a washer between the spring and arm. Sleeve 65ˣ and hemming die 67 are also slotted for arm 73. Said sleeve is held from endwise movement in the cap-carrier by its inclosed end 74. On the sleeve immediately behind arm 73 is supported a loose collar 75 against which at the proper time cam 69 operates as above described. The clamp member 68 is formed to fit the outside of sleeve 65ˣ and a channel on the inside of hemming die 67. Member 68ˣ similarly fits the spindle 66 and the sleeve holder 12. The described construction provides that the spindle 65, the sleeve 65ˣ, the solder-clamp-member 68 and the die 67 must rotate together; but said spindle, clamp member and die are each horizontally movable independently. The die 67 has a bearing on the sleeve and an outside bearing 70 in the cap-carrier as shown. As before stated this die has a longitudinal groove in one side forming a way for clamp member 68. Means for moving this die forward and backward comprises a groove 76 in which bear actuating arms 77 of the pivoted die-operating lever 78 normally retracted by its spring. To an end of said lever is secured a roller which at the proper time engages a fixed cam 79 and is turned on its pivot to throw the die 67 forward. In the walls of groove 76 are notches 80 to receive the spring pressed latch 81 at the proper time to stop the forward rotation of the spindle and of parts rotated thereby at a predetermined point, namely, at the close of one rotation. Said notches 80 are of such shape as to allow reverse rotation without interference by the latch (see Fig. 25ª), after which the rotation may be forward again until the latch again strikes the notch shoulder or side. At the proper moment the latch 81 falls into said notch under influence of its spring. When rotation is required the latch is raised by the latch-cam 82 on the solder shelf support. The spindle 66 and sleeve 66ˣ are also slotted for an arm or key 73ˣ whereby they rotate together when pinion 70ˣ is rotated. This sleeve and its die 67ˣ are held from lengthwise movement as shown. Spindle 66 and its clamp block 14 are normally held retracted by a cam 68ʸ, and are released by disengagement of the cam in time to move forward to clamping position under action of its spring 83, and simultaneously with forward movement of spindle 65 and block 13. The clamp member 68ˣ is normally held retracted by a cam 70ʸ engaging a notch in said member, which cam is formed to release member 68ˣ as cam 69 is about to advance solder-clamp-member 68, and spring 84 forces member 68ˣ forward to clamping position, by its movement pressing back the solder shelf 61. In Fig. 23 member 68ˣ has just been advanced and cam 69 is ready to advance member 68.

81ˣ is a latch similar to latch 81, and is operated at the same time by a fixed cam 82ˣ and is adapted to stop spindle 66, sleeve 66ˣ, and hemming die 67ˣ at the proper time by entering a notch or opening in the sleeve 66ˣ, as at 66ʸ, this being as shown the slot in which member 68ˣ slides, said member being formed to permit the latch end to enter in front of it. At its outer end spindle 66 has a roller bearing in an annular way 66ᶻ.

The cap fed between the blocks 13 and 14 is clamped by a forward movement of spindle 66 and its block 14 by action of the spring 83, and by forward movement of spindle 65 and its block 13, such movement being caused by a high or raised part in groove 17. This movement of spindle 65 compresses spring 71. It also acts against spring 83, clamp block 14 being spring pressed. The advance of the block 13 against the cap moves it to meet block 14 advanced by spring 83. The cap being thus clamped, the solder-clamp-member 68$^x$ is released by its cam and advanced by its spring 84 simultaneously with or just following which the opposite solder-clamp-member 68 is pressed forward by cam 69 whereby said members clamp the lower or forward end of the section of solder ribbon to the cap being hemmed. The locking latches are now raised from notches 80 and 66$^y$ by cams 82 and 82$^x$; and the pinions 70 and 70$^x$ engage gear segments 86 supported on the frame and rotate spindles 65 and 66 and connected parts including clamp blocks 13 and 14 until the notches come around again to the latches whereupon the springs force them into engagement. During this rotation of the cap on its own axis, which coincides with the axis of spindles 65 and 66, the periphery of the cap with an end of the solder ribbon clamped thereto, is forced lengthwise along the groove 87 in a fixed spinning die or guide 88 by the forward rotary movement of the cap carrier. The guide 88 is removable whereby other guides may be substituted for different size caps. Thus by one complete turn of the cap, and the forward movement along the winding or spinning guide the solder ribbon is wound or spun onto the edge of the cap, and the ribbon-end 55 caused to overlap the opposite end of the ribbon, and in this condition, by the movement of the machine, the overlap is brought into contact with a hot iron 90 (see Figs. 18, 18$^a$ and 24) and which is adjustable, and the overlapped ends are welded together, no other part of the solder touching the hot iron. Electrical or other means may be employed to heat the iron. After the complete rotation of the cap on its axis has been arrested by the latches 81, 81$^x$, and after the welding operation described, the hemming die 67 is forced forward by the cam 79 acting on fork 78, and, in coöperation with the resisting die 67$^x$, presses the solder ribbon spun on the edge of the cap more firmly against the cap. The smoothing or finishing of the solder on the cap after the soldering of the ribbon ends can be effected by a relative rotary movement between the cap and solder clamps. In the instance illustrated this is effected as follows. After the hemming operation the pressure of the die 67 is released slightly by operation of cam 79, the cap being held by spring 83 between blocks 13 and 14, and the pinion 70 engages a short rack 70$^z$ on the opposite side of the pinion from the longer rack 86, thereby turning the spindle back a short distance. At the close of this backward movement wheel 70 meshes with another short rack 91 whereby it is again turned forward until again stopped by its latch 81. This reverse and forward movement reciprocates the cap between the dies to smooth or polish the hem particularly at the welded joint. This operation is due to the fact that the cap is clamped between blocks 13 and 14, the former being fixed to its shaft and the latter free to rotate on its shaft. When shaft 65 is turned block 13 and die 67 turn with it (being keyed together); since the cap is clamped against block 13 by block 14, which is spring pressed and is free to turn on its shaft, the turning of block 13 turns the cap clamped thereto with it. This movement of the cap while the surface of die 67$^x$ is close to the cap, and while die 67$^x$ remains at rest, smooths the solder joint on the cap. Pinion 70$^x$ is not provided with coöperating racks corresponding to 70$^z$ and 91, and hence die 67$^x$ is stationary on its axis during said reciprocating movement. The spindle operating cams while the cap is still held in the hemming dies release the cap clamp, the hemming dies then separate and the completely hemmed cap drops into a chute 105 and passes out of the machine.

The cap-carrier is continuously rotated by a pulley shaft 100 on which is a worm 101 that drives a worm gear 102 and a gear 103 fixed on the shaft 10. Said gear 103 meshes with a pinion 37 on the shaft 36 having crank arm 35 that reciprocates the pawl bar carrying the pawl that actuates the rotating solder-ribbon-forming dies 27 and 27$^x$, as hereinbefore described.

It is understood that the preferred forms of improvements which have been described herein can be varied without departure from the new principles of construction and operation.

It will be understood that all parts of the machine can be either adjusted or changed to hem caps of different sizes. Thus the terminal or foot 4 of the cap-charging chute is made detachable to permit the substitution of another of suitable dimension and form to so convey and support a cap of any selected size that its center will be in line with the center of the clamp to be gripped thereby. One at least of the hemming dies is made detachable for a like purpose. As shown in the present instance the right hand or female die is removable to permit substitution, and the male or left hand die is provided with the series of annular ribs 67$^y$ each adapted to co-act with an opposite die appropriate to hem a cap of a particular size.

It will be understood from the foregoing that the term "ribbon" is used in a general sense, and also that it is not essential in all cases that the solder prepared for spinning on the cap edge should be of the precise form herein illustrated, and that other channeled forms can be employed without departure from the main invention. Thus, for example, it would be practicable for a skilled mechanic to adapt the machine for a U-shaped solder ribbon or for solder shaped in other forms. It is further obvious that metal disks for different uses can be hemmed with solder in a manner substantially as set forth herein and that plain or flat disks or caps and caps having beads or indentations of different kinds can be hemmed in like manner.

Though it is preferred to weld the solder ribbon at the overlap as described before operation of the hemming dies, this is not deemed always essential and the time of the weld may be varied.

The solder ribbon, which may be described as a channel-ribbon, is not necessarily so notched as to bring the overlap end 55 on the outside of the hemmed cap, though this is the preferred construction. Many features of the invention are independent of the notching of the ribbon and would be useful and operative without it.

In some cases the clamping block 14 on spindle 66 may be carried by said spindle in a manner to allow block 14 to turn independently of said spindle. (See Fig. 24ª.) The object of this construction is to allow block 14 to turn (while spindle 66 is at rest) with block 13 and spindle 65 during the smoothing of the overlap of solder on the cap.

To provide that the pin 24 be properly situated at the free end of guide 22$^x$ in each case for caps of different sizes said guide is made adjustable. The pivot 23 is in a hub or extension of the guide 22$^x$ which pivot loosely supports said guide which toward its free end rests on the arm 20. Said pivot 23 is fixed in the hub 112 of an adjustable member 113 having a short lug or part 117 extending into a curved slot 114 in a fixed bracket 115. A clamping screw is denoted by 116.

To stop feeding of the caps in case of breakage or exhaustion of the solder wire, I provide a roller 106 on a lever 107 pivoted at 108 and having a pin 109, the roller being normally held up by the solder wire. When said wire allows the roller to descend the pin enters the path of the caps and stops them. It is not essential in all cases to use such means or equivalent means although preferred. Since the rotation of the die rolls, and the consequent advance of the solder wire toward the hemming devices, and the formation of ribbon, is caused by the operation of advancing caps, acting on arm 28, the stopping of the cap feed also stops rotation of said rolls. In the construction shown herein such stopping is governed by the tension of the solder wire between the wire supply and the die rolls.

Having thus described the invention what I claim is,—

1. In a machine for hemming caps, having bent rims, with solder, a cap-feeding chute which is adapted to receive and guide caps of various sizes whichever way their rims are turned, said chute having a closed side along which caps travel, a fixed switch point on said side for automatically guiding out of the chute caps misplaced in the chute, and means adjustably supported opposite said switch point to insure coöperation between said point and caps whether of one size or another.

2. In a machine for hemming caps having bent rims with solder, an inclined cap-feeding chute having a closed bottom and provided with a switch point fixed to said closed bottom for automatically guiding caps placed in the mouth of said chute to one side or the other of said point according to the direction in which their rim edges engage said switch point, said point engaging the cap rim below its crown, and a continuously rotating cap carrier.

3. In a machine for hemming caps with solder, a cap-feeding chute provided with means for automatically discharging caps misplaced in the chute, said means comprising a branch chute, and a switch device to guide the ingoing cap, and an adjustable switch-supporting part opposite the first named switch point.

4. In combination with a cap-feeding chute, a rotary carrier, a series of suitably supported cap clamps on said carrier, said clamps individually rotating at intervals while said carrier moves continuously, said chute being situated to deliver caps to said clamps successively, and each clamp in succession during continued motion of the series adapted to receive and hold a cap.

5. In a machine for hemming caps with solder, the combination of a continuously rotatable carrier, cap clamps normally at rest on but rotating with said carrier, means for feeding caps one at a time to that one of the clamps on the moving carrier which is passing the feeding means, and means for causing the clamp to clamp said cap during continued movement of the carrier.

6. In a machine for hemming caps with solder, the combination of a rotary cap-carrier, devices for mechanically feeding caps to cap-clamps on the carrier, and cap-clamps, the clamps holding caps being independently rotatable while carried by the rotating carrier.

7. In a machine for hemming caps with solder, a frame with standards, a shaft having journals in the standards, and a rotatable cap-carrier made in a plurality of transverse sections splined on the shaft and held in contact with each other by the standards.

8. In a machine for hemming caps with solder, a frame with standards, a shaft having journals in the standards, a rotatable car-carrier made in transverse sections splined on the shaft and held in contact with each other by the standards, and a chute for feeding caps, said chute extending within the periphery of the carrier.

9. In a machine for hemming caps with solder, a frame, a rotatable cap-carrier, a chute for feeding caps, said carrier carrying cap-clamps, and devices for hemming caps with solid sections of solder.

10. In a machine for hemming caps with solder, a frame, a rotatable cap-carrier, a chute for feeding caps, said carrier carrying cap-clamps, said carrier being fixed to a shaft journaled in the frame, and a cam in the frame to actuate a clamp member, the opposite member being actuated by a spring.

11. In a machine for hemming caps with solder, a frame, a rotatable cap-carrier, a chute for feeding caps, said carrier carrying cap-clamps, said carrier being fixed to a shaft journaled in the frame, a cam in the frame to actuate a clamp member, and means for retracting the clamps.

12. The combination of a rotary cap-carrier, independently rotary cap-clamping devices, mechanism for winding a ribbon of solder about the cap, and a clamping device to clamp the ribbon to the cap.

13. In a machine for hemming caps with solder, the combination of a rotatable cap-carrier, a cap-feeding chute having a transverse delivery foot extending within the periphery of the carrier, and a cap-clamp on the carrier moving parallel with the bottom of said foot.

14. In a machine of the character described, the combination of means for feeding caps, mechanism for moving a ribbon of solder comprising a toothed wheel, a wheel-driving pawl, a pin normally holding the pawl out of the line of engagement with the wheel, and a trip in the path of the cap to disengage the pin and permit the pawl to move into operative engagement with the ratchet wheel.

15. In a machine of the character described, the combination of means for feeding caps, mechanism for moving a ribbon of solder comprising a ratchet wheel, a wheel-driving pawl, a pin normally holding the pawl out of the line of engagement with the wheel, a trip in the path of the cap to disengage the pin and permit the pawl to move into operative engagement with the ratchet wheel, and a member to guide and hold the pawl out of its wheel-engaging path.

16. In a machine for hemming caps with solder, means for feeding caps, a cap-clamping device, mechanism including a toothed wheel for moving a solder ribbon toward a clamp, and a wheel-driving pawl comprising two members acting successively.

17. In a machine for hemming caps with solder, means for feeding caps, a cap-clamping device, mechanism including a toothed wheel for moving a solder ribbon toward a clamp, a wheel-driving pawl comprising two members acting successively, said members being separately pivoted on their support, and a device to keep them in operative relation to each other and to the wheel when free to engage said wheel.

18. In a machine for hemming caps, and in combination with coöperating parts of such machine, a support for solder in the form of wire, positively driven rotatable dies adapted to directly convert wire of any suitable diameter into channel-shape ribbon, and a feeding device whereby the solder wire passes said dies at the required speed.

19. In a machine for hemming caps, the combination of a support for solder wire, dies in coöperating relation to such support and adapted to partly split the wire and directly form it from wire into ribbon channeled in cross section, means for rotating the dies, and a channeled ribbon guide extending between the dies to the vicinity of the operative co-acting parts of said dies.

20. In a machine for hemming caps, the combination of a support for solder wire, dies in coöperating relation to such support and adapted to reduce the thickness of solder in the wire and to directly form it from wire into ribbon channeled in cross section, with the inside and outside of the same shape, means for rotating said dies, and a ribbon guide having male and female parts, and corresponding in shape to the ribbon, the guide extending between the dies adjacent to the point of delivery from the dies to receive said formed ribbon.

21. In a machine for hemming caps, the combination of a device for feeding solder wire, with rotatable dies for forming the wire into a ribbon, and with a ribbon guide, said guide being male and female and similar in cross section to the ribbon, the entrance to said guide being closely adjacent to the point of delivery from the ribbon forming dies, and a ribbon cutting blade moving through the guide walls at right angles thereto, one of said walls having a waste outlet.

22. In a machine for hemming caps, the combination of a support for solder wire, rotatable metal forming and reducing dies in coöperative relation to said support for forming the wire into channeled ribbon, and a stripper of similar shape to that of the channeled ribbon, to strip such formed ribbon from the die.

23. In a machine for hemming caps, the combination of a support for solder wire, rotatable metal-forming-and-reducing dies in coöperating relation to said support for forming the wire into ribbon, and a swinging ribbon guide comprising two members one of which extends to the ribbon forming point to strip the ribbon from a die.

24. In a machine for hemming caps, a guide having a transverse slot and adapted for conveying a ribbon of solder, in combination with a blade for cutting off a section of the ribbon and notching the section end cut off, and mechanism to actuate the blade, said blade being movable at right angles to the guide, said guide having a waste outlet.

25. In a machine for hemming caps comprising means for feeding caps, a rotating cap clamp, means for conveying a ribbon of solder to the vicinity of a clamped cap, in combination with a blade for cutting off a section of the ribbon, mechanism to actuate the blade, and means for cutting the opposite end of the section to make it of predetermined length, said means being adjacent the clamp and operative simultaneously with the sectioning cut and timed to correspond with the feeding of the caps, and means for securing the forward end of said cut ribbon to a cap in said clamp, whereby the rotation of the clamp winds the ribbon on the cap.

26. In a machine for hemming caps, a rotating cap-clamp, means for conveying a ribbon of solder to the vicinity of the clamp, in combination with means including two blades for cutting it in sections, one blade being situated near the entrance to the conveyer and the other near the clamp, means for feeding caps, operation of said blades being timed to correspond with the feeding of caps and means for connecting the solder sections successively to caps in the form of a hem extending onto both sides of each cap.

27. In a machine for hemming caps, means for conveying a ribbon of solder of the width to be applied to the caps, in combination with means for cutting it in sections at points at a distance apart greater than the periphery of a cap, said cutting means notching and cutting away a portion of solder on an end of each section on one side, leaving an overlapping portion on the other side.

28. In a machine for hemming caps, the combination of a solder-ribbon-conveying-guide, a cap-clamp, and a separate solder clamp acting independently on the cap-supported solder, the cap being held in said cap clamp.

29. In a machine for hemming caps, the combination of a solder-ribbon-conveying-guide, a cap-clamp, a solder-clamp whereby the solder is clamped to the cap, and a movable rest for the solder, said rest being normally in the path of the solder and pushed aside by the solder clamp.

30. In a machine for hemming caps, the rotating cap-carrier, a cap-clamp, devices for conveying a solder ribbon to the cap, a clamp to clamp the solder to the cap, and mechanism for rotating the cap-clamp on its axis to spin the solder about the cap edge.

31. In a machine for hemming caps, the rotating cap-carrier, a cap-clamp, including rotating spindles, devices for conveying a solder ribbon to the cap, a clamp to clamp solder to the cap, mechanism for rotating the cap-clamp on its axis to spin the solder about the cap edge, latches to hold the spindles from rotating, and means for withdrawing the latches to permit temporary rotation of the cap-clamp spindles.

32. In a machine for hemming caps, the combination of a rotatable cap-carrier, an independently rotatable cap-clamp with clamp blocks or faces, devices for placing solder about the edge of a clamped cap, and hemming dies acting on the solder on the cap outside the cap-clamp blocks.

33. In a machine for hemming caps, the combination of a rotatable cap-carrier, an independently rotatable cap-clamp with clamp blocks or faces, devices for placing solder about the edge of a clamped cap, hemming guides acting on the solder on the cap outside the cap-clamp blocks, and mechanism to reverse the rotation of the cap-clamp and reversely rotate the cap between the dies.

34. In a machine for hemming caps, the combination of a rotating cap-carrier, and a cap-clamp said clamp comprising two spindles each having a clamping block or face, a cam whereby one spindle is moved to the clamping position, and a spring whereby the other spindle is moved to said position.

35. In a machine for hemming caps, the combination of two rotatable spindles having clamping blocks, a solder clamp, cap-hemming dies, sleeves to support the parts, and sleeve holders, the several parts contained in the holders being connected to rotate together, and the spindles, solder-clamps and one of the dies being independently movable endwise.

36. In a machine for hemming caps, a cap clamp comprising two clamp blocks, in combination with hemming dies, and with a solder-clamp comprising two members each movable through a corresponding die.

37. In a machine for hemming caps, a rotatable cap-clamp comprising alined spindles each having a clamp block, a cam to move one spindle lengthwise, a returning spring for said spindle, a spring to move the other spindle forward, and a cam to withdraw the latter spindle and hold its actuating spring inoperative.

38. In a machine for hemming caps with a ribbon of solder having a predetermined length in excess of the circumference of the cap, the combination of devices for bending the ribbon around the cap edge and overlapping the ribbon ends on said edge, a heated overlap-melting iron supported near the path of the cap whereby to melt the ribbon overlap, a cap-carrier, and dies for fixing the ribbon and cap edge firmly together.

39. In a machine for hemming caps with a ribbon of solder having a predetermined length in excess of the circumference of a cap, the combination of means for cutting away a part of the ribbon to notch such excess, and devices for overlapping the ribbon ends on the cap edge.

40. In a machine for hemming caps, means for providing a ribbon of solder having a predetermined length in excess of the circumference of a cap, devices for overlapping the ribbon ends on the cap edge, and an over-lap-melting iron said iron being adjustable.

41. In a machine for hemming caps, a cap-clamp comprising independently rotatable spindles, hemming dies to fix solder on a cap held in the clamp, means to actuate the dies to press a solder hem upon the cap, and means to reciprocate one of the spindles circumferentially to reciprocate the cap within the dies.

42. In a machine for hemming caps, a cap-clamp comprising independently rotatable spindles, hemming dies to fix solder on a cap held in the clamp, means to actuate the dies to press a solder hem upon the cap, and mechanism to reciprocate one of the spindles circumferentially to reciprocate the cap within the dies, in combination with means for welding the ends of a solder hem spun on the cap.

43. In a machine for hemming caps, a cap-carrier, a cap-clamp, means for spinning solder on the edge of a clamped cap, and a heater for welding the solder.

44. In a machine for hemming caps, a cap-carrier, a cap-clamp, means for spinning solder on the edge of a clamped cap, and a heater for welding the solder, said heater being adjustable to and from the path of solder on the cap edge.

45. In a machine for hemming caps, a cap-carrier, a cap-clamp, devices to spin solder on a cap edge, a pair of hemming dies, and means to actuate the dies.

46. In a machine for hemming caps, a cap-carrier, a cap-clamp, devices to spin solder on a cap edge, a pair of hemming dies, and means to actuate the dies, one of said dies being interchangeable with others of different size.

47. In a machine for hemming caps, a cap-carrier, a cap-clamp, devices to spin solder on a cap edge, a pair of hemming dies, and means to actuate the dies, one of said dies being interchangeable and the other adapted by annular beads or the like to co-act with any one of several sized interchangeable dies.

48. In a machine for hemming caps, a cap-carrier, a rotatable cap-clamp on said carrier, devices for feeding solder to the edge of a clamped cap, and a segmental part having a solder guiding groove to co-act with the rotating cap to spin the solder on said cap.

49. In a machine for hemming caps, a cap-carrier, a rotatable cap-clamp on the carrier, devices for feeding solder to the edge of a clamped cap, means for rotating the cap, and a segmental part having a solder guiding groove to co-act with the rotating cap to spin the solder on said cap said segment being interchangeable with others for caps of various sizes.

50. In a machine for hemming caps, a curved rotary cap-carrier, a cap-clamp having two co-acting faces, and a cap-chute adapted to carry a cap to a central position between the clamp faces, said chute having a delivery foot curved similarly to the cap-carrier.

51. In a machine for hemming caps, a cap-carrier, a cap-clamp having two co-acting faces, a cap-chute adapted to convey a cap to a central position between the clamp faces, said chute having a detachable foot or terminal for interchange with others to provide that caps of various diameters may be properly conveyed and supported to be centrally clamped.

52. In a machine for hemming caps, means for providing a ribbon of solder having a predetermined length in excess of the circumference of the cap, devices for overlapping the ribbon ends on the cap edge, and means for fixing the ribbon ends and the cap edge together.

53. In a machine for hemming caps, a continuously rotating cap-carrier, means for providing a ribbon of solder having a predetermined length in excess of the circumference of the cap, devices for overlapping the ribbon ends on the cap edge, and means for fixing the ribbon ends and cap edge together.

54. In a machine for hemming caps, the combination of means for feeding caps, means for clamping a cap thus fed, said means for clamping comprising a spindle, a clamping block fixed to the spindle, a second spindle, a coöperating clamping block loosely carried by the second spindle, and means for turning the first spindle independently of the second spindle while said blocks are clamping a cap between them.

55. In a machine for hemming caps, means for feeding caps, hemming dies, means for clamping a cap said means comprising a spindle, a clamping block fixed to the spindle, a second spindle, a clamping block loosely carried by the second spindle whereby the first named spindle and both blocks may turn together, the second spindle remaining at rest, said hemming dies each surrounding and rotatable with one of said spindles.

56. In a machine for hemming caps, means for feeding caps, hemming dies, means for clamping a cap, said means comprising a spindle, a clamping block fixed to the spindle, a second spindle, a clamping block loosely carried by the second spindle, said hemming dies each surrounding and rotatable with one of said spindles, the hemming die surrounding the first named spindle being also longitudinally movable.

57. In a machine for hemming caps, means for feeding caps, means for supplying solder ribbon to hem such caps said means comprising a pawl guide, an adjustable pivot for said guide, and a pawl and ratchet wheel controlling the supply of solder.

58. In a machine for hemming caps, means for feeding caps, means for supplying solder ribbon to hem such caps, said means comprising a pawl guide, a slotted fixed bracket, a part adjustable in the slot of said bracket, a pivot for said guide in said adjustable part, and a pawl and ratchet wheel controlling the supply of solder.

59. In a machine for hemming caps, a chute for feeding caps, means for supplying solder wire to the machine to furnish material for the hems, and means to automatically arrest the feeding of the caps upon the breakage or exhaustion of the wire.

60. In a machine for hemming caps, a cap-feeding chute, a solder wire supply, means for forming a ribbon of the wire, means for fixing the ribobn to a cap, and means to stop the feeding of caps upon failure of the wire supply.

61. In a machine for hemming caps, the combination of a rotatable cap-carrier and means for rotating said carrier continuously, with means for bending solder onto the peripheries of caps while the carrier is in continuous motion.

62. The combination of a continuously rotatable cap-carrier, with mechanism for supplying solder to caps carried on the carrier, and a device to automatically arrest the action of the solder supplying mechanism upon a failure in the cap supply.

63. In a cap hemming machine, a cap feeding device, a solder supplying device, and means for automatically arresting said cap feeding device upon the failure of the solder supply.

64. In a machine for hemming caps, cap clamps, solder clamps, devices for fixing a ribbon of solder on a cap, and means for causing relative movement between a hemmed cap in said clamp and a smoothing surface in situation to act on the hem.

65. In a machine for hemming caps, the combination of a continuously rotatable carrier or head, means for rotating the head continuously, a series of devices spaced on the head and acting to place a band of solder around the periphery of a cap while the head is in motion.

66. In a machine for hemming caps, the combination with coöperating parts of such machine, of a support for solder in the form of wire, rotatable dies, one being adapted to center a wire of any diameter, that the wire may be acted upon at any desired point of the circumference of the wire by the coöperating die, to form a channeled ribbon, and means for rotating said dies.

67. In a machine for hemming caps, the combination with coöperating parts of such machine, of a support for solder wire, a rotatable female die adapted to center a wire of any suitable diameter, a male die mounted to act on such supported wire longitudinally at the desired point of the circumference of the wire to partly split the wire and to form it into a channeled ribbon, and means for rotating said dies.

68. In a machine for hemming caps and in combination with coöperating parts of such machine, a support for solder wire, rotatable metal-forming and reducing dies in coöperating relation to said support for forming the wire into ribbon, and a swinging ribbon guide comprising two members one of which extends to the ribbon forming point to strip the ribbon from a die.

69. In a machine for hemming caps with ribbon, rotatable dies, a ribbon-conveying guide, and a stripper of corresponding shape to the ribbon, fitting closely to the forming member of the die to deflect the end of the ribbon from said member into the conveying guide.

70. In a machine for hemming caps, means for providing a ribbon of solder having a predetermined length in excess of the circumference of the cap, for which the ribbon is designed to provide overlapping ends, and devices for placing such ribbon on the cap.

71. In a machine for hemming caps, the combination of a cap-clamp, a solder clamp, and a hemming device, rotatable together, and each movable endwise independently of the other.

72. In a machine for hemming caps, the combination of a rotatable cap clamp, a solder clamp, a hemming device, a locking device, and means for unlocking said clamps.

73. In a machine for hemming caps, a solder clamp to hold an end of a solder ribbon to a cap, means to rotate the clamp while it is thus holding a ribbon-end to such cap, and a device in coöperative relation with the solder ribbon and cap to wind the ribbon on the cap.

74. In a machine for hemming caps, a cap carrier, a solder clamp, and a device to swing a ribbon of solder in a peripheral direction around the cap.

75. In a machine for hemming caps, means for feeding a ribbon of solder, an adjustable blade holder holding a blade in a swinging guide to cut the ribbon in sections, and means to actuate the holder.

76. In a machine for hemming caps, the combination of means for feeding a ribbon of solder, a swinging guide for the ribbon, a blade holder, a blade to cut the ribbon in sections, and means to actuate the holder and blade.

77. In a machine for hemming caps, means for providing a ribbon of solder, devices for placing the ribbon on the cap, and means comprising a heating device to weld the ends of the ribbon on the cap.

78. In a machine for hemming caps, a ribbon conveying guide, a ribbon-cutting blade, and a movable shelf to arrest the section of ribbon cut off.

79. In a machine for hemming caps, a ribbon conveying guide, a ribbon-cutting blade, and a shelf for the ribbon cut off to rest upon, said shelf being adjustable.

80. In a machine for hemming caps, a rotating cap carrier, a solder shelf in coöperating relation with the carrier, a device to place a solder ribbon on the shelf, and means to move the shelf.

81. In a machine for making solder hemmed caps, the combination of a pair of rolls, one provided with a groove and the other provided with a cutting projection adapted to enter said groove, means for feeding a round solder wire between said rolls whereby said round wire is directly reduced to channel-ribbon form in one operation, means for severing parts of said channel-ribbon and hemming the several portions upon can caps, and means for operating said rolls.

82. In a machine for making solder hemmed caps, the combination of a pair of rolls, one provided with a groove and the other provided with a cutting projection adapted to enter said groove, means for feeding a round solder wire between said rolls, whereby said round wire is directly reduced to channel-ribbon form in one operation, means for severing parts of said channel-ribbon and hemming them upon can caps, and means for operating said rolls, said operating means governed by the solder passing toward the hemming devices.

83. In a machine for making solder hemmed caps, the combination of a pair of rolls, one provided with a groove and the other provided with a cutting projection adapted to enter said groove, means for feeding a round solder wire between said rolls, whereby said round wire is directly reduced to channel-ribbon form in one operation, means for severing parts of said channel-ribbon and hemming the parts upon caps, and means for operating said rolls, said operating means governed by the tension of the solder wire passing to the die rolls.

84. In a cap hemming machine, a cap feeding device, a solder supplying device, ribbon-forming rolls, means for driving said rolls, and means for arresting operation of said cap feeding device and said roll-driving means upon failure of the solder supply.

85. In a cap hemming machine, a cap feeding device, a solder supplying device, ribbon-forming rolls, means for driving said rolls, and means for arresting operation of said driving means upon failure of the solder supply.

86. In a machine for hemming caps, and in combination with coöperating parts of such machine, a support for round solder wire, rotatable having respectively a groove and a cutting projection and adapted to directly convert such round wire into channel-shape ribbon, and a feeding device whereby the solder wire passes said dies at the required speed.

87. In a machine for hemming caps, the combination of a support for solder wire, dies in coöperating relation to such support and adapted to partly split the wire and directly form it from wire into ribbon channeled in cross section, and means for rotating the dies.

In testimony whereof, I have signed this specification in the presence of two subscribing witnesses.

JAMES D. WILSON.

Witnesses:
HERBERT L. FRANC,
BENJ. R. CATLIN.

---

Copies of this patent may be obtained for five cents each, by addressing the "Commissioner of Patents, Washington, D. C."